US011636358B2

(12) United States Patent
Suzuki et al.

(10) Patent No.: US 11,636,358 B2
(45) Date of Patent: Apr. 25, 2023

(54) DATA ANALYSIS APPARATUS, DATA ANALYSIS METHOD, AND DATA ANALYSIS PROGRAM

(71) Applicant: Hitachi, Ltd., Tokyo (JP)

(72) Inventors: Mayumi Suzuki, Tokyo (JP); Yasuho Yamashita, Tokyo (JP); Takuma Shibahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 352 days.

(21) Appl. No.: 16/876,199

(22) Filed: May 18, 2020

(65) Prior Publication Data

US 2020/0380392 A1    Dec. 3, 2020

(30) Foreign Application Priority Data

May 29, 2019 (JP) .............................. JP2019-100316

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G06N 5/04* | (2023.01) |
| *G06N 20/00* | (2019.01) |

(52) U.S. Cl.
CPC ............... *G06N 5/04* (2013.01); *G06N 20/00* (2019.01)

(58) Field of Classification Search
CPC ................. G07F 17/32; G07F 17/3211; G07F 17/3213
USPC ........................ 706/11; 463/1, 20, 22, 25, 39
See application file for complete search history.

(56) References Cited

U.S. PATENT DOCUMENTS

2011/0208495 A1    8/2011    Yuta

FOREIGN PATENT DOCUMENTS

WO    2010016110 A1    2/2010

OTHER PUBLICATIONS

Extended European Search Report received in corresponding European Application No. 20176428.9 dated Oct. 23, 2020.
Rahangdale, A. et al., "Deep Neural Network Regularization for Feature Selection in Learning-to-Rank", IEEE Access, Apr. 26, 2019, pp. 53988-54006, vol. 7.

(Continued)

*Primary Examiner* — Adetokunbo O Torimiro
(74) *Attorney, Agent, or Firm* — Mattingly & Malur, PC

(57) ABSTRACT

A data analysis apparatus executes: a selection process selecting a first feature variable group that is a trivial feature variable group contributing to prediction and a second feature data group other than the first feature variable group from a set of feature variables; an operation process operating a first regularization coefficient related to a first weight parameter group corresponding to the first feature variable group in a manner that the loss function is larger, and operating a second regularization coefficient related to a second weight parameter group corresponding to the second feature variable group in a manner that the loss function is smaller, among a set of weight parameters configuring a prediction model, in a loss function related to a difference between a prediction result output in a case of inputting the set of feature variables to the prediction model and ground truth data corresponding to the feature variables.

12 Claims, 13 Drawing Sheets

(56) References Cited

OTHER PUBLICATIONS

Marco Tulio Ribeiro et al., "Why Should I Trust You?" Explaining the Predictions of Any Classifier, Proceeding of the 22nd ACM SIGKDD International Conference on Knowledge Discovery and Data Mining. ACM 2016.

David Harrison, Jr., "Hedonic Housing Prices and the Demand for Clean Air1", Journal of Environmental Economics and Management 5, 1978. p. 81-102.

FIG. 1

EXAMPLE 1) LOGISTIC REGRESSION

SENIOR HIGH SCHOOL STUDENT DATA:
$x_{1,n}$: AGE, $x_{2,n}$: NUMBER OF ATTENDANCES, $x_{3,n}$: BODY HEIGHT, $y'_n$: WHETHER STUDENT CAN GRADUATE FROM SENIOR HIGH SCHOOL
$y_n$: CALCULATED PREDICTED VALUE OF WHETHER STUDENT CAN GRADUATE FROM SENIOR HIGH SCHOOL (A) AUC=0.99: $y_n = \sigma(w_1 x_{1,n} + w_2 x_{2,n} + w_3 x_{3,n})$
$= \sigma(\underline{\underline{0.8 x_{1,n}}} + 0.15 x_{2,n} + 0.05 x_{3,n})$ $x_{1,n}$ IS NEARLY EQUIVALENT TO $y_n$

TRIVIAL FEATURE VARIABLE (B) AUC=0.85: $y_n = \sigma(w_2 x_{2,n} + w_3 x_{3,n})$
$= \sigma(\underline{\underline{0.95 x_{2,n}}} + 0.05 x_{3,n})$ SUFFICIENTLY HIGH PREDICTION ACCURACY ONLY WITH $x_{2,n}$

NON-TRIVIAL FEATURE VARIABLE

MAINTAIN AUC  $y_n = \sigma(w_1 \underline{\underline{x_{1,n}}} + w_2 \underline{\underline{x_{2,n}}} + w_3 x_{3,n})$

OPERATION FOR SUPPRESSION   OPERATION FOR INCREASE

FIG. 2

EXAMPLE 2) LOGISTIC REGRESSION

COLLEGE STUDENT DATA:
$x_{1,n}$: NUMBER OF ATTENDANCES, $x_{2,n}$: TEST SCORE, $x_{3,n}$: BODY HEIGHT, $y'_n$: WHETHER STUDENT CAN GRADUATE FROM SENIOR HIGH SCHOOL
$y_n$: CALCULATED PREDICTED VALUE OF WHETHER STUDENT CAN GRADUATE FROM SENIOR HIGH SCHOOL (A) AUC=0.90 : $y_n = \sigma(w_1 x_{1,n} + w_2 x_{2,n} + w_3 x_{3,n})$ $= \sigma(0.6 x_{1,n} + \underline{\underline{0.35 x_{2,n}}} + 0.05 x_{3,n})$

TRIVIAL FEATURE VARIABLE

CONTRIBUTION DEGREE OF $x_{1,n}$ IS HIGH AS IN PREVIOUS KNOWLEDGE (B) AUC=0.75 : $y_n = \sigma(w_2 x_{2,n} + w_3 x_{3,n})$ $= \sigma(\underline{\underline{0.95 x_{2,n}}} + 0.05 x_{3,n})$

NON-TRIVIAL FEATURE VARIABLE

SUFFICIENTLY HIGH PREDICTION ACCURACY ONLY WITH $x_{2,n}$ $y_n = \sigma(\underline{\underline{w_1 x_{1,n}}} + \underline{\underline{w_2 x_{2,n}}} + w_3 x_{3,n})$

MAINTAIN AUC    OPERATION FOR SUPPRESSION    OPERATION FOR INCREASE

FIG. 8

| | Attribute | Information |
|---|---|---|
| Features | (1) CRIM | per capita crime rate by town |
| | (2) ZN | proportion of residential land zoned for lots over 25,000 square feet |
| | (3) INDUS | proportion of non-retail business acres per town |
| | (4) CHAS | Charles River dummy variable (= 1 if tract bounds river; 0 otherwise) |
| | (5) NOX | nitric oxides concentration (parts per 10 million) |
| | (6) RM | average number of rooms per dwelling |
| | (7) AGE | proportion of owner-occupied units built prior to 1940 |
| | (8) DIS | weighted distances to five Boston employment centers |
| | (9) RAD | index of accessibility to radial highways |
| | (10) TAX | full-value property-tax rate per $10,000 |
| | (11) PTRATIO | pupil-teacher ratio by town |
| | (12) B | 1000(Bk − 0.63)^2 where Bk is the proportion of blacks by town |
| | (13) LSTAT | % lower status of the population |
| Target | MEDV | Median value of owner-occupied homes in $1000's |

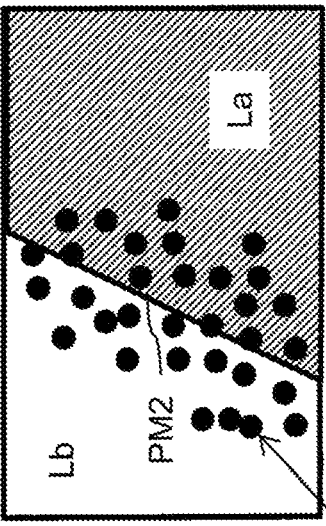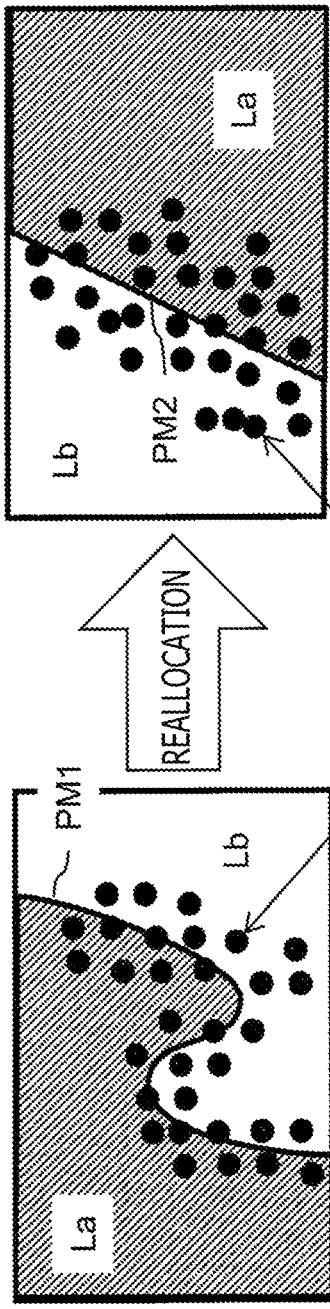

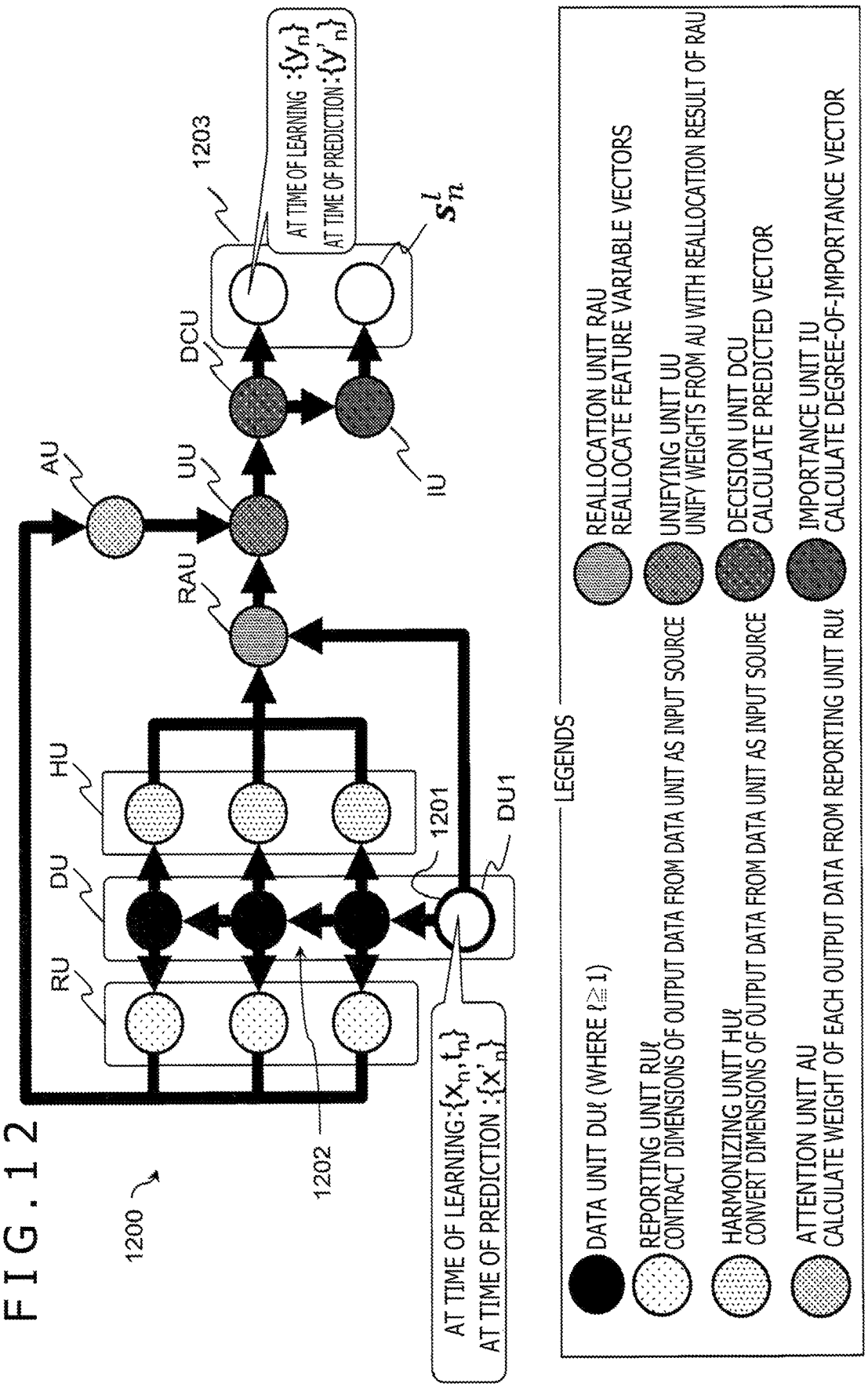

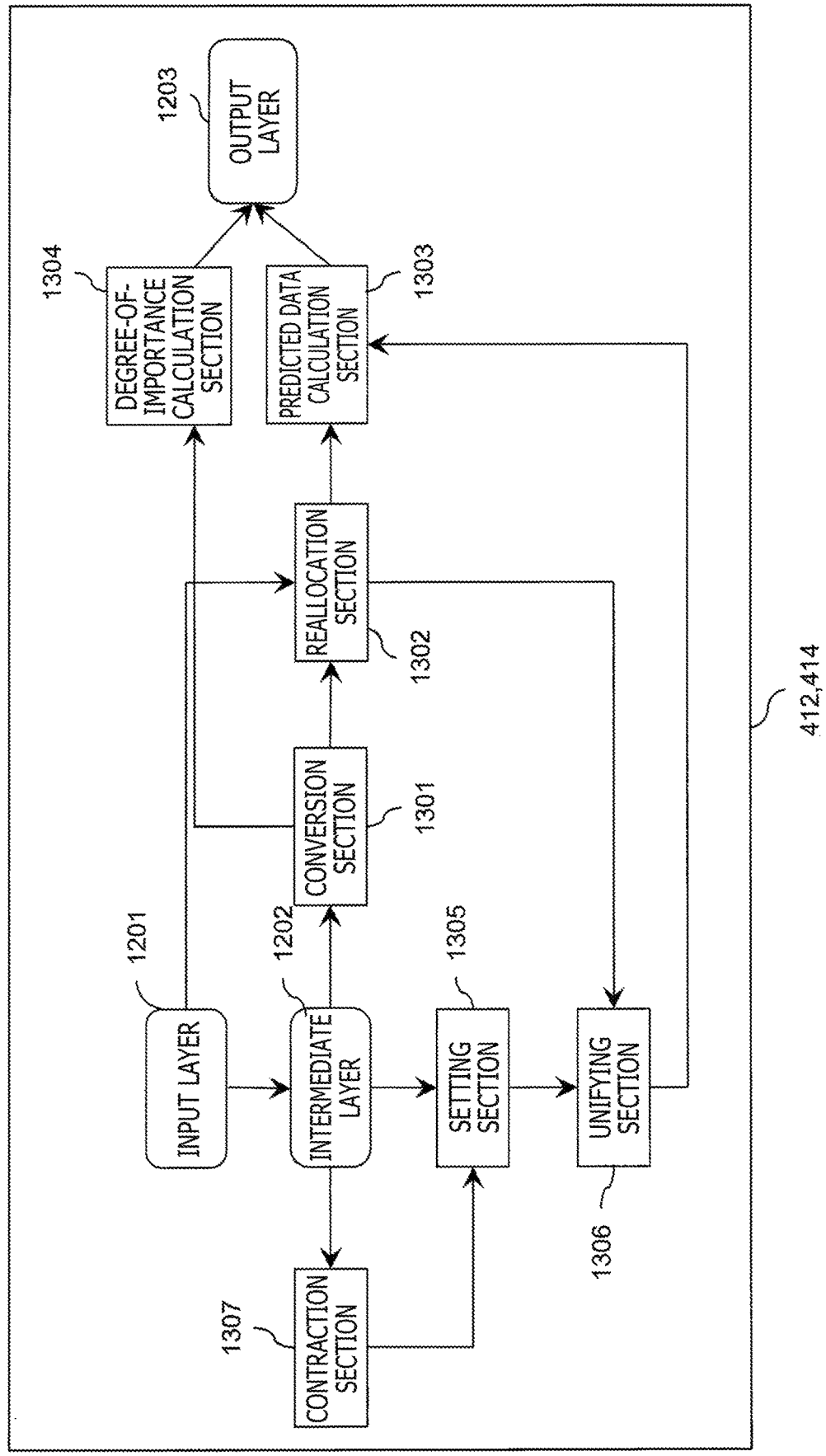

DATA ANALYSIS APPARATUS, DATA ANALYSIS METHOD, AND DATA ANALYSIS PROGRAM

CLAIM OF PRIORITY

The present application claims priority from Japanese patent application JP 2019-100316 filed on May 29, 2019, the content of which is hereby incorporated by reference into this application.

BACKGROUND OF THE INVENTION

1. Field of the Invention

The present invention relates to a data analysis apparatus, a data analysis method, and a data analysis program for analyzing data.

2. Description of the Related Art

Machine learning is one of technologies for realizing artificial intelligence (AI). The machine learning technology is configured with a learning process and a prediction process. First, in the learning process, learning parameters are calculated in such a manner that an error between a predicted value obtained from a feature variable vector that is an input and an actual value (true value) is minimum. Subsequently, in the prediction process, a new predicted value is calculated from data not used in learning (hereinafter, referred to as test data).

Learning parameter calculation methods and learning parameter computing methods to attain maximum prediction accuracy have been invented so far. With an approach called perceptron, for example, a predicted value is output on the basis of a computing result of linear combination between an input feature variable vector and a weight vector. A neural network is also called multilayer perceptron and capable of solving linearly inseparable problems by using a plurality of perceptrons in a multi-layered fashion. Deep learning is an approach of introducing new technologies such as dropout to the neural network and stepped into the limelight as an approach capable of achieving high prediction accuracy.

In this way, development of machine learning technologies has been underway so far with a view to improving prediction accuracy. There is known an approach, other than the development of the machine learning technologies, of improving prediction accuracy by selecting data for use in learning in advance as disclosed in International Publication No. WO2010/016110. According to International Publication No. WO2010/016110, feature variables important for prediction are selected by making use of the possibility of using a magnitude of each element value of the weight vector that is one of the learning parameters as an importance degree of each feature variable contributing to prediction in multiple regression analysis.

The machine learning is often used as a technology, other than the prediction of a probability of contracting a disease or a probability of a machine failure, for identifying feature variables contributing to the prediction of the probability of contracting a disease or the probability of a machine failure on condition that a highly accurate prediction result can be obtained.

For example, in analysis of healthcare information, it is predicted whether a person is a patient using data about blood tests performed on patients with a disease X and on other people, feature variables contributing to the prediction are extracted as important feature variables, and the important feature variables are made much use of in establishment of a treatment policy or a daily life guidance for a patient.

With the approach of prediction by computing the linear combination as described in International Publication No. WO2010/016110 and the perceptron, the feature variables contributing to the prediction are extracted by an approach of identifying the important feature variables using the magnitude of each element value of the weight vector. Furthermore, with an approach of prediction by computing non-linear combination, feature variables contributing to prediction are extracted by an approach of identifying important feature variables using an out-of-bag error rate in random forests, which is one of approaches using a decision tree.

As described in Ribeiro, Marco Tulio, Sameer Singh, and Carlos Guestrin. "Why should I trust you?: Explaining the predictions of any classifier." Proceedings of the 22nd ACM SIGKDD International Conference on Knowledge Discovery and Data Mining. ACM, 2016, development of an approach capable of extracting important feature variables is underway in deep learning capable of solving linearly inseparable problems and the like. The development of these approaches has helped establish new effective treatment policies and daily life guidances.

For example, in a case in which specific feature variables are nearly equivalent to a true value, it is possible to make highly accurate prediction using only the specific feature variables. In addition, in a case, for example, in which feature variables other than the specific feature variables also contribute to prediction of the true value, such possibilities are considered to occur that importance degrees of the feature variables other than the specific feature variables are relatively reduced and that it is impossible to extract the other feature variables as the feature variables contributing to the prediction. It is estimated that the specific feature variables, in particular, are trivial feature variable related to the disease X by the analysis and the like performed so far.

Furthermore, to make it clear that the feature variables (hereinafter, "non-trivial feature variables") other than the trivial feature variables contributing to prediction (hereinafter, simply "trivial feature variables") among the specific feature variables contribute to prediction, it is necessary to perform prediction using only the non-trivial feature variables. In this case, a reduction in prediction accuracy is conceivable because of no use of the trivial feature variables.

SUMMARY OF THE INVENTION

An object of the present invention is to provide a data analysis apparatus, a data analysis method, and a data analysis program capable of extracting non-trivial feature variables contributing to prediction as important feature variables.

A data analysis apparatus according to one aspect of the present invention is a data analysis apparatus including: a processor that executes a program; and a storage device that stores the program, the processor executing: a selection process for selecting a first feature variable group that is a trivial feature variable group contributing to prediction and a second feature variable group other than the first feature variable group from a set of feature variables; an operation process for operating a first regularization coefficient related to a first weight parameter group corresponding to the first feature variable group among a set of weight parameters configuring a prediction model in such a manner that the loss function is larger, and operating a second regularization coefficient related to a second weight parameter group corresponding to the second feature variable group among the set of weight parameters configuring the prediction model in such a manner that the loss function is smaller, in a loss function related to a difference between a prediction result output in a case of inputting the set of feature variables to the prediction model and ground truth data corresponding to the feature variables; and a learning process for learning the set of weight parameters of the prediction model in such a manner that the loss function is minimum as a result of operating the first regularization coefficient and the second regularization coefficient by the operation process.

According to a representative embodiment of the present embodiment, it is possible to extract feature variables contributing to prediction among non-trivial feature variables contributing to prediction as important feature variables. Objects, configurations, and advantages other than those described above will be readily apparent from the description of embodiments given below.

BRIEF DESCRIPTION OF THE DRAWINGS

FIG. 1 is an explanatory diagram 1 depicting a trivial feature variable and non-trivial feature variables;

FIG. 2 is an explanatory diagram 2 depicting a trivial feature variable and non-trivial feature variables;

FIG. 8 is an explanatory diagram depicting a feature vector Features and ground truth data Target;

FIGS. 11A and 11B are explanatory diagrams depicting an example of reallocation of feature variable vectors;

FIG. 12 is an explanatory diagram depicting an example of a structure of a neural network according to a fifth embodiment; and FIG. 13 is a block diagram depicting an example of a functional configuration of a data analysis apparatus according to the fifth embodiment.

DESCRIPTION OF THE PREFERRED EMBODIMENTS

Figure 3:
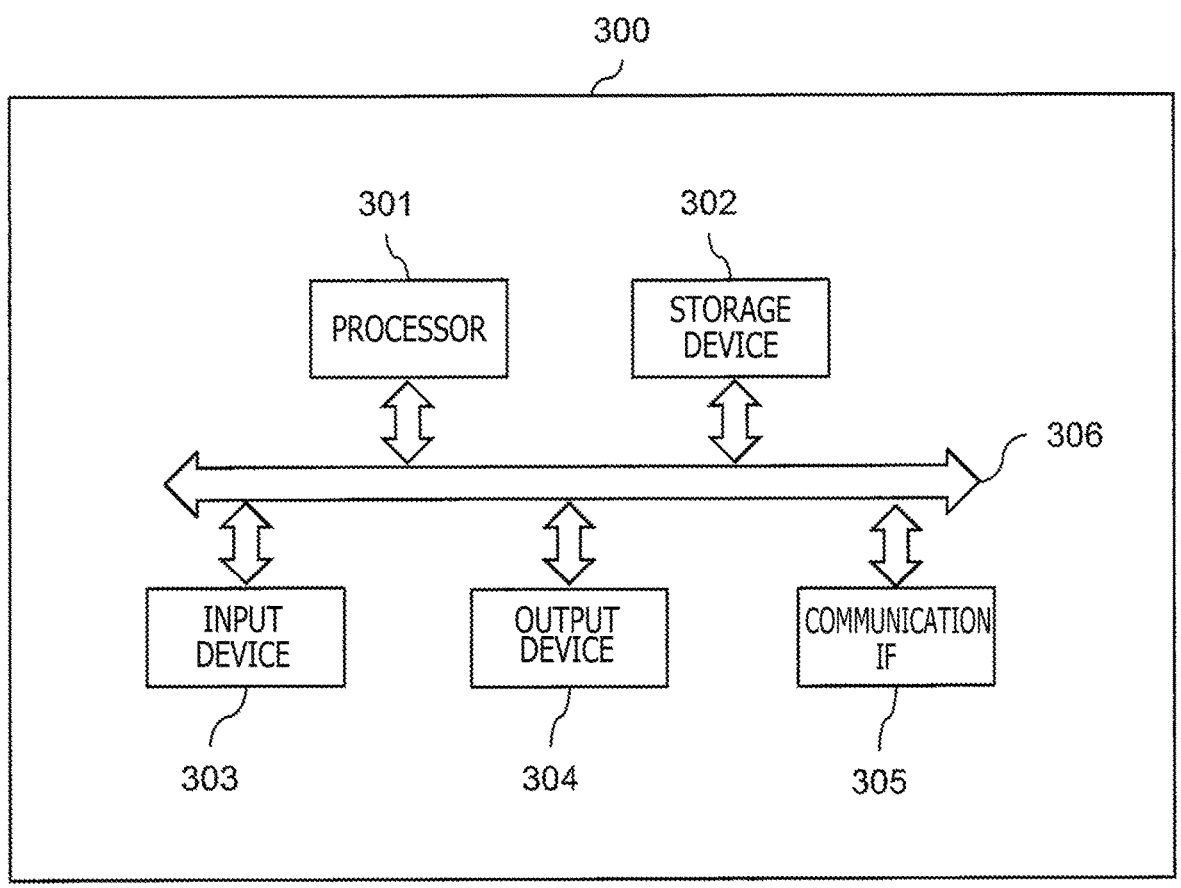
FIG. 3 is a block diagram depicting an example of a hardware configuration of a data analysis apparatus according to a first embodiment.

A data analysis apparatus according to a first embodiment will first be described. The data analysis apparatus according to the first embodiment selects trivial feature variables and non-trivial feature variables, and displays a prediction result by increasing degrees of contribution of the non-trivial feature variables to prediction and suppressing degrees of contribution of the trivial feature variables in a learning process.

<Trivial Feature Variables and Non-Trivial Feature Variables>

FIG. 1 is an explanatory diagram 1 depicting a trivial feature variable and non-trivial feature variables. FIG. 1 depicts an example of logistic regression for predicting whether a senior high school student can graduate from senior high school. In FIG. 1, a feature variable $x_{1,n}$ indicates an age, a feature variable $x_{2,n}$ indicates the number of attendances, a feature variable $x_{3,n}$ indicates a body height, and a predicted value $y_n$ indicates whether a senior high school student can graduate from senior high school. n indicates an n-th (where n is an integer equal to or greater than 1) senior high school student. It is assumed that among the feature variables $x_{1,n}$ to $x_{3,n}$, the feature variable $x_{1,n}$ is a specific feature variable nearly equivalent to a true value of a predicted value $y_n$.

(A) indicates logistic regression for predicting the predicted value $y_n$ using the feature variables $x_{1,n}$ to $x_{3,n}$. $\sigma$ indicates a sigmoid function, $w_1$ to $w_3$ indicate degrees of contribution (also referred to as weight parameters) to prediction of the predicted value $y_n$, and an area under curve (AUC) indicates prediction accuracy (0.00≤AUC≤1.00). A higher value of the AUC indicates higher prediction accuracy. Since the specific feature variable $x_{1,n}$ is nearly equivalent to a true value of the predicted value $y_n$ indicating whether the senior high school student can graduate from senior high school, the specific feature variable $x_{1,n}$ is regarded as a trivial feature variable.

The AUC is an abbreviation of area under an ROC curve, which is an area of a part surrounded by a horizontal axis and a vertical axis of a receiver operating characteristic curve (ROC curve), and the AUC closer to 1 means that accuracy of a model is higher. The ROC is plotted with the horizontal axis indicating a false-positive rate and the vertical axis indicating a true-positive rate. In other words, the AUC closer to 1 refers to achieving a high true-positive rate at a time at which a value of a false-positive rate is low; thus, it is possible to evaluate that the model has high accuracy with a smaller bias. It is noted herein that the false-positive rate is a rate obtained by dividing the number of false-positive samples by a sum of the number of false-positive samples and the number of true-negative samples, and the true-positive rate is a rate obtained by dividing the number of true-positive samples by a sum of the number of true-positive samples and the number of false-negative samples.

In the first embodiment, in a case, for example, in which the predicted value $y_n$ is a test result (positive) and a correct label $t_n$ is having a disorder, samples (feature variables $x_n$) are true-positive. Furthermore, in a case in which the predicted value $y_n$ is the test result (positive) and a correct label $t_n$ is not having a disorder, samples (feature variables $x_n$) are false-positive. Moreover, in a case in which the predicted value $y_n$ is a test result (negative) and a correct label $t_n$ is having a disorder, samples (feature variables $x_n$) are false-negative. Furthermore, in a case in which the predicted value $y_n$ is the test result (negative) and a correct label $t_n$ is not having a disorder, samples (feature variables $x_n$) are true-negative.

In a case in which a degree of contribution $w_1$ to prediction of the predicted value $y_n$ of the feature variable $x_{1,n}$ is high, degrees of contribution of the other feature variables, that is, a degree of contribution $w_2$ of the feature variable $x_{2,n}$ and a degree of contribution $w_3$ of the feature variable $x_{3,n}$ are relatively low. Owing to this, it is impossible to extract the other feature variables as feature variables contributing to prediction although the other feature variables actually include the feature variables contributing to the prediction.

(B) indicates logistic regression for predicting the predicted value $y_n$ while excluding the trivial feature variable $x_{1,n}$ among the feature variables $x_{1,n}$ to $x_{3,n}$. In this case, excluding the trivial feature variable $x_{1,n}$ causes an increase in a value of the degree of contribution $w_2$ of the feature variable $x_{2,n}$ ($w_2$=0.95) in (B), while the value of the degree of contribution $w_2$ of the feature variable $x_{2,n}$ is low ($w_2$=0.15) in (A). In this way, the specific feature variable $x_{2,n}$, which also contributes to the prediction, is regarded as a feature variable contributing to prediction although being the non-trivial feature variable.

Therefore, the data analysis apparatus according to the present embodiment operates parameters of a loss function in such a manner that a weight of the trivial feature variable nearly equivalent to the true value of the predicted value $y_n$ is suppressed, operates the parameters of the loss function in such a manner that a weight of the non-trivial feature variable is increased, and maintains the prediction accuracy AC for the predicted value $y_n$ without reducing the prediction accuracy AC.

FIG. 2 is an explanatory diagram 2 depicting a trivial feature variable and non-trivial feature variables. FIG. 2 depicts an example of logistic regression for predicting whether a college student can graduate from college. In FIG. 2, the feature variable $x_{1,n}$ indicates the number of attendances, the feature variable $x_{2,n}$ indicates a test score, the feature variable $x_{3,n}$ indicates a body height, and the predicted value $y_n$ indicates whether a college student can graduate from college. n indicates an n-th (where n is an integer equal to or greater than 1) college student. It is assumed that among the feature variables $x_{1,n}$ to $x_{3,n}$, the feature variable $x_{1,n}$ is a specific feature variable which is known to contribute to prediction of the predicted value $y_n$ despite low equivalence to a true value.

(A) indicates logistic regression for predicting the predicted value $y_n$ using the feature variables $x_{1,n}$ to $x_{3,n}$. Since the specific feature variable $x_{1,n}$ is the number of attendances, it is assumed that a college student the number of attendances of whom is large is a serious student and evaluated as an excellent student. Since the specific feature variable $x_{1,n}$ is known to contribute to prediction of the predicted value $y_n$, the specific feature variable $x_{1,n}$ is regarded as a trivial feature variable.

In a case in which the degree of contribution $w_1$ of the feature variable $x_{1,n}$ to prediction of the predicted value $y_n$ is considerably high, the degrees of contribution of the other feature variables, that is, the degree of contribution $w_2$ of the feature variable $x_{2,n}$ and the degree of contribution $w_3$ of the feature variable $x_{3,n}$ are relatively low. Owing to this, it is impossible to extract the other feature variables as feature variables contributing to prediction although the other feature variables actually include the feature variables contributing to the prediction.

(B) indicates logistic regression for predicting the predicted value $y_n$ while excluding the trivial feature variable $x_{1,n}$ among the feature variables $x_{1,n}$ to $x_{3,n}$. In this case, the machine learning enables an increase in the value of the degree of contribution $w_2$ of the feature variable $x_{2,n}$ ($w_2$=0.95) in (B), while the value of the degree of contribution $w_2$ of the feature variable $x_{2,n}$ is low ($w_2$=0.35) in (A). In this way, the specific feature variable $x_{2,n}$ is regarded as a non-trivial feature variable contributing to prediction.

Therefore, the data analysis apparatus according to the present embodiment operates parameters of a loss function in such a manner that the weight of the trivial feature variable known to contribute to prediction of the predicted value $y_n$ is reduced, operates the parameters of the loss function in such a manner that the weight of the non-trivial feature variable is increased, and maintains the prediction accuracy AC for the predicted value $y_n$ without reducing the prediction accuracy AC.

<Example of Hardware Configuration of Data Analysis Apparatus>

FIG. 3 is a block diagram depicting an example of a hardware configuration of the data analysis apparatus according to the first embodiment. A data analysis apparatus 300 has a processor 301, a storage device 302, an input device 303, an output device 304, and a communication interface (communication IF) 305. The processor 301, the storage device 302, the input device 303, the output device 304, and the communication IF 305 are connected to one another by a bus 306. The processor 301 controls the data analysis apparatus 300. The storage device 302 serves as a work area of the processor 301. Furthermore, the storage device 302 is a non-transitory or transitory recording medium that stores various programs and data. Examples of the storage device 302 include a read only memory (ROM), a random access memory (RAM), a hard disk drive (HDD), and a flash memory. Data is input through the input device 303. Examples of the input device 303 include a keyboard, a mouse, a touch panel, a numeric keypad, and a scanner. The output device 304 outputs data. Examples of the output device 304 include a display and a printer. The communication IF 305 is connected to a network to transmit and receive data.

<Example of Functional Configuration of Data Analysis Apparatus 300>

Figure 4:
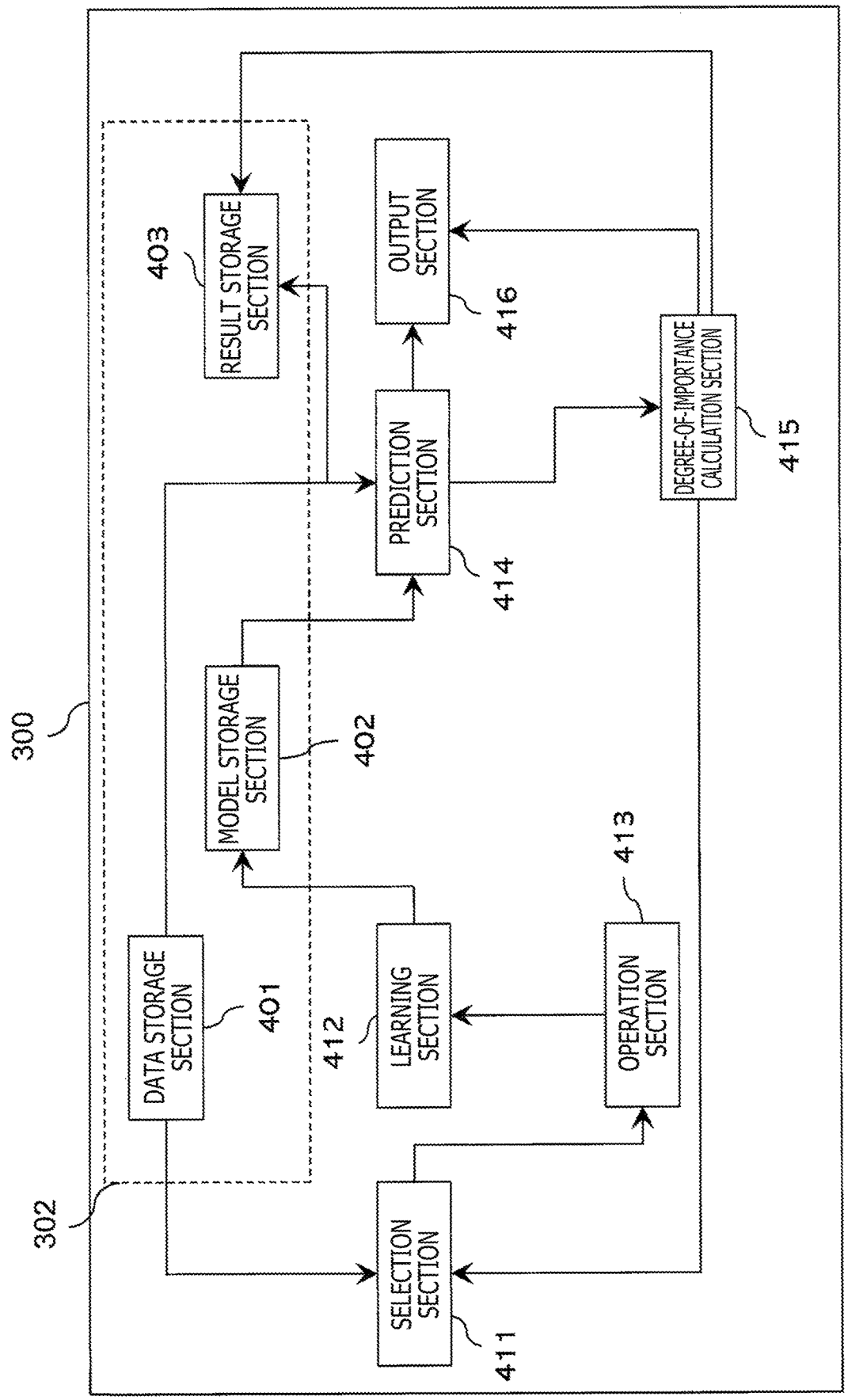
FIG. 4 is a block diagram depicting an example of a functional configuration of the data analysis apparatus according to the first embodiment.

FIG. 4 is a block diagram depicting an example of a functional configuration of the data analysis apparatus 300 according to the first embodiment. The data analysis apparatus 300 has a data storage section 401, a model storage section 402, a result storage section 403, a selection section 411, a learning section 412, an operation section 413, a prediction section 414, a degree-of-importance calculation section 415, and an output section 416. The data storage section 401, the model storage section 402, and the result storage section 403 are specifically realized by, for example, the storage device 302 depicted in FIG. 3. Furthermore, the selection section 411, the learning section 412, the operation section 413, the prediction section 414, the degree-of-importance calculation section 415, and the output section 416 are specifically realized by, for example, causing the processor 301 to execute a program stored in the storage device 302 depicted in FIG. 3.

The data storage section 401 stores training data for use in a learning process by the learning section 412 and test data for use in a prediction process by the prediction section 414.

The training data is sample data configured with, for example, each combination $\{x_{d,n}, t_n\}$ of feature variables $x_{d,n}$ and a correct label $t_n$ that is a true value thereof (where d=1, 2, . . . , and D, n=1, 2, . . . , and N. D is the number of types (dimensions) of feature variables and N is the number of samples). The feature variables $x_{d,n}$ are, for example, test data or image data about each patient.

The test data is feature variables $x_{d,n}$ different from the training data. The combination of feature variables $x_{d,n}$ as the test data from which the predicted value $y_n$ is obtained and the correct label $t_n$ that is the true value thereof is handled as the training data.

The model storage section 402 stores output data from the learning section 412. The output data contains a weight vector $w_n$, which indicates the degrees of contribution, of the feature variables $x_{d,n}$.

The result storage section 403 stores the predicted value $y_n$ calculated by a prediction process by the prediction section 414, the weight parameters $w_n$ that are learning parameters, and important feature variables contributing to prediction and extracted by the degree-of-importance calculation section 415.

The selection section 411 selects trivial feature variables and non-trivial feature variables from a set of feature variables $x_{d,n}$ that are the training data. The selection section 411 may select, as the trivial feature variables, feature variables suggested to be academically important in an accumulation of findings made by developers or engineers so far, documents, or the like.

In addition, the selection section 411 selects, as the non-trivial feature variables, remaining feature variables $x_{d,n}$ that are not selected as the trivial feature variables from among the set of feature variables $x_{d,n}$. In FIGS. 1 and 2, for example, the selection section 411 selects the feature variable $x_{1,n}$ as the trivial feature variable and selects the feature variables $x_{2,n}$ and $x_{3,n}$ as the non-trivial feature variables.

The learning section 412 updates a hyperparameter and the weight parameters $w_n$ in the following Equation (1) in such a manner that an error between the predicted value $y_n$ obtained from the feature variables $x_{d,n}$ that are inputs and the correct label $t_n$ is minimum.

[Expression 1]

Equation (1)

$$y_n = \sigma(w_1 x_{1,n} + w_2 x_{2,n} + \ldots + w_D x_{D,n}) \quad (1)$$
$$= \sigma(w^t x_n)$$

Equation (1) above is an example of a prediction expression of the logistic regression that is one approach of the machine learning using computing of linear combination in calculation of the predicted value $y_n$. The predicted value $y_n$ is calculated on the basis of the feature variables $x_{d,n}$ and the weight parameters $w_n \in R^D$ (where D is an integer equal to or greater than 1). $w_t$ is a weight vector having the weight parameters $w_n$ as elements, and t in the weight vector $w_t$ means transpose. $\sigma$ denotes an activation function such as the sigmoid function. $x_n$ is a feature variable vector having the feature variables $x_{d,n}$ as elements.

The learning section 412 sets a loss function $L(w_n)$ for calculating the learning parameters (weight vector $w_t$) using above Equation (1) in such a manner that the error between the predicted value $y_n$ obtained from the feature variable vector $x_n$ that is the inputs and the correct label $t_n$ that is an actual value (true value) is minimum. Specifically, the learning section 412 sets, for example, weight parameters $w_{k,n}$ of trivial feature variables $x_{k,n}$ selected by the selection section 411 and weight parameters $w_{h,n}$ of non-trivial feature variables $x_{h,n}$ selected by the selection section 411 to a degree-of-contribution operation term $R_P(w^t_n)$.

The loss function $L(w_n)$ is represented by a sum of an error function $E(w_n)$ and a degree-of-contribution operation term $R_P(w_n)$, as depicted in the following Equations (2) and (3).

[Expression 2]

Equation (2)

$$\mathcal{L}(w_n) = E(w_n) + R_P(w_n) \quad (2)$$

-continued

Equation (3)

$$R_P(w_n) = \lambda \sum_{j=1}^{N} |w_j|_p \quad (3)$$

$w_n$ is a weight vector having, as elements, weight parameters $w_1$ to $w_D$ corresponding to feature variables $x_{1,n}$ to $x_{d,n}$ of the feature variable vector $x_n$ that is an n-th sample. The error function $E(w_n)$ may be, for example, a mean squared error or a cross entropy error between the predicted value $y_n$ and the correct label $t_n$.

Furthermore, Equation (3) is the degree-of-contribution operation term $R_P(w_n)$. A hyperparameter in the degree-of-contribution operation term $R_P(w_n)$ is set by the operation section 413. In Equation (3), $\lambda$ ($0.0 \leq \lambda \leq 1.0$) is a loss coefficient. As $\lambda$ is larger, a value of the loss function $L(w_n)$ becomes higher. p denotes a norm dimension.

Moreover, a prediction expression in a case in which the weight vector $w_n$ is present in each feature variable $x_{d,n}$ is expressed by, for example, the following Equation (4) by the machine learning approach.

[Expression 3]

Equation (4)

$$y_n = \sigma(w_{1,n} x_{1,n} + w_{2,n} x_{2,n} + \ldots + w_{D,n} x_{D,n}) \quad (4)$$
$$= \sigma(w^t_n x_n)$$

Furthermore, a loss function $L(w^t_n)$ is represented by a sum of an error function $E(w^t_n)$ and a degree-of-contribution operation term $R_P(w^t_n)$, as depicted in the following Equations (5) and (6).

[Expression 4]

Equation (5)

$$\mathcal{L}(w^t_n) = E(w^t_n) + R_P(w^t_n) \quad (5)$$

Equation (6)

$$R_P(w^t_n) = \frac{\lambda}{N} \sum_{j=i}^{N} |w^t_j|_p \quad (6)$$

Furthermore, the degree-of-contribution operation term $R_P(w^t_n)$ of Equation (6) may be replaced by a degree-of-contribution operation term $R_1(w_n)$ of the following Equation (7) with norm dimension p=1.

[Expression 5]

Equation (7)

$$R_1(w_n) = \frac{\lambda}{N} \sum_{n=1}^{N} \left( \mu \sum_{k \in T} |w_{k,n}| + \nu \sum_{h \in U} |w_{h,n}| \right) \quad (7)$$

In the degree-of-contribution operation term $R_1(w_n)$ of Equation (7), $\lambda$ is the loss coefficient described above, $\mu$ is a first regularization coefficient related to the weight parameters $w_{k,n}$ of the trivial feature variables $x_{k,n}$ and $v$ is a second regularization coefficient related to the weight parameters $w_{h,n}$ of the non-trivial feature variables $x_{h,n}$. A relationship between the first regularization coefficient $\mu$ and the second regularization coefficient $v$ is, for example, $\rho+v=1.0$. $\lambda$, $\mu$, and $v$ are hyperparameters. Furthermore, k indicates a number representing the trivial feature variables $x_{k,n}$, T indicates the number of the trivial feature variables $x_{k,n}$, h indicates a number representing the non-trivial feature variables, and U indicates the number of the non-trivial feature variables $x_{h,n}$.

Adding the degree-of-contribution operation term $R_1(w_n)$ to the error function $E(w_n^r)$ by the learning section 412 makes it possible to produce effects of preventing growth of the weight parameters $w_{k,n}$ of the trivial feature variables $x_{k,n}$ and of obtaining a sparse model.

Moreover, the degree-of-contribution operation term $R_P(w^t_n)$ of Equation (6) may be replaced by a degree-of-contribution operation term $R_2(w_n)$ of the following Equation (8) with the norm dimension p=2.

[Expression 6]

Equation (8)

$$R_2(w_n) = \frac{\lambda}{N} \sum_{n=1}^{N} \left( \mu \sum_{k \in T} \|w_{k,n}\| + v \sum_{h \in U} \|w_{h,n}\| \right) \quad (8)$$

Adding the degree-of-contribution operation term $R_2(w_n)$ to the error function $E(w_n)$ by the learning section 412 makes it possible to produce effects of preventing growth of the weight parameters $w_{k,n}$ of the trivial feature variables $x_{k,n}$ and of suppressing overfitting to obtain a smooth prediction model.

Furthermore, the degree-of-contribution operation term $R_P(w^t_n)$ may be replaced by a degree-of-contribution operation term $R_{els}(w_n)$ of the following Equation (9).

[Expression 7]

Equation (9)

$$R_{els.}(w_n) = \frac{\lambda}{N}$$
$$\sum_{n=1}^{N} \left( \mu \sum_{k \in T} \{\alpha\|w_{k,n}\| + (1-\alpha)|w_{h,n}|\} + v \sum_{h \in U} \{\alpha\|w_{h,n}\| + (1-\alpha)|w_{h,n}|\} \right) \quad (9)$$

Equation (9) is an equation of an elastic net of linear combination between an L1 norm and an L2 norm of each weight vector $w_n$, and is a degree-of-contribution operation term obtained by the linear combination between Equations (7) and (8). In Equation (9), $\alpha(0.0 \leq \alpha \leq 1.0)$ is an elastic coefficient. The elastic coefficient $\alpha$ is also a hyperparameter.

Adding the degree-of-contribution operation term $R_{els}(w_n)$ to the error function $E(w_n)$ makes it possible to produce an effect of preventing the growth of the weight parameters $w_{k,n}$ of the trivial feature variables $x_{k,n}$ to obtain a sparse model as depicted in Equation (7) and an effect of suppressing overfitting to obtain a smooth model as depicted in Equation (8).

The operation section 413 operates the hyperparameter in the degree-of-contribution operation term for increasing the degrees of contribution of the non-trivial feature variables to prediction and reducing the degrees of contribution of the trivial feature variables to prediction. The operation section 413 operates the hyperparameters described above, that is, the loss coefficient $\lambda$, the first regularization coefficient $\mu$ related to the weight parameters $w_{k,n}$ of the trivial feature variables $x_{k,n}$, the second regularization coefficient $v$ related to the weight parameters $w_{h,n}$ of the non-trivial feature variables $x_{h,n}$, and the elastic coefficient $\alpha$. Since the first regularization coefficient $\mu$ and the second regularization coefficient $v$ are each set to a value from 0.0 to 1.0, it is possible to facilitate control over a degree of suppression of the weight parameters $w_{k,n}$ of the trivial feature variables $x_{k,n}$.

Furthermore, the operation section 413 operates the first regularization coefficient $\mu$ and the second regularization coefficient $v$ in such a manner that a sum of the first regularization coefficient $\mu$ and the second regularization coefficient $v$ is, for example, 1.0. The operation section 413 operates the first regularization coefficient $\mu$ and the second regularization coefficient $v$ in such a manner that the first regularization coefficient $\mu$ is greater than the second regularization coefficient $v$. The operation section 413 may operate the hyperparameters on condition that the first regularization coefficient $\mu$ related to the weight parameters $w_{k,n}$ of the trivial feature variables $x_{k,n}$ is greater than 0.5.

On this condition, if the first regularization coefficient $\mu$ is set greater than the second regularization coefficient $v$, a value of the term multiplied by the first regularization coefficient $\mu$ becomes greater within the degree-of-contribution operation term $R_P(w^t_n)$. Owing to this, learning is carried out in such a manner that values of a first weight parameter group, that is, the trivial feature variables $x_{k,n}$ are made smaller than values of a second weight parameter group, that is, the non-trivial feature variables $x_{h,n}$ to make the loss function $L(w^t_n)$ smaller. As a result, it is possible to suppress the weight parameters $w_{k,n}$ of the trivial feature variables $x_{k,n}$, compared with a case of not using the degree-of-contribution operation term $R_P(w^t_n)$. Furthermore, a range of the value of the first regularization coefficient $\mu$ may be set, for example, to be equal to or greater than 0.7.

Moreover, the norm dimension p may be set to 0.5 or the like while examples of the L1 norm, the L2 norm, and the elastic net have been illustrated.

The prediction section 414 executes a prediction process by giving the feature variables $x_{d,n}$ as the test data to a prediction model for which the weight vector $w_n$ is applied to Equations (1) and (2), and outputs the predicted value $y_n$ to the result storage section 403 and the output section 416.

In addition, the prediction section 414 calculates the AUC for the predicted value $y_n$ described above. A case in which the AUC is equal to or smaller than a threshold means a failure in prediction. In this case, the operation section 413 may re-operate each hyperparameter and the learning section 412 may perform relearning of the weight vector $w_n$.

The degree-of-importance calculation section 415 aligns the feature variables $x_{d,n}$ in descending order of contribution to prediction using the weight vector $w_n$ stored in the model storage section 402, and carries out calculation to regard the feature variables $x_{d,n}$ as important feature variables in the descending order of contribution to prediction. The descending order of contribution to prediction is, for example, descending order of norms of the weight vector $w_n$. The degree-of-importance calculation section 415 calculates the norms of the weight vector $w_n$.

The degree-of-importance calculation section 415 assigns degrees of importance to the feature variables $x_{d,n}$ in the descending order of contribution to prediction. The degree of importance is proportional to the norm and takes on a greater value as the norm is higher. The degree-of-importance calculation section 415 may add a weight of a value equal to or greater than 0.0 and smaller than 1.0 to the norms of the weight vector $w_n$ of the trivial feature variables. Furthermore, the degree-of-importance calculation section 415 may exclude the trivial feature variables at a time of aligning the feature variables $x_{d,n}$ in the descending order of contribution to prediction.

Moreover, the degree-of-importance calculation section 415 may assign the norms themselves as the degrees of importance. To calculate the degree of importance, an out-of-bag error rate may be used without using the weight vector $w_n$ depending on the machine learning approach to be used.

The selection section 411 may thereby further select the trivial feature variables and the non-trivial feature variables while referring to the degrees of importance calculated by the degree-of-importance calculation section 415.

It is noted that a plurality of apparatuses may configure the data analysis apparatus 300. For example, a plurality of data analysis apparatuses 300 may be present for load distribution. Alternatively, a plurality of apparatuses including one or more functions may configure the data analysis apparatus 300.

<Example of Data Analysis Process Procedure>

Figure 5:
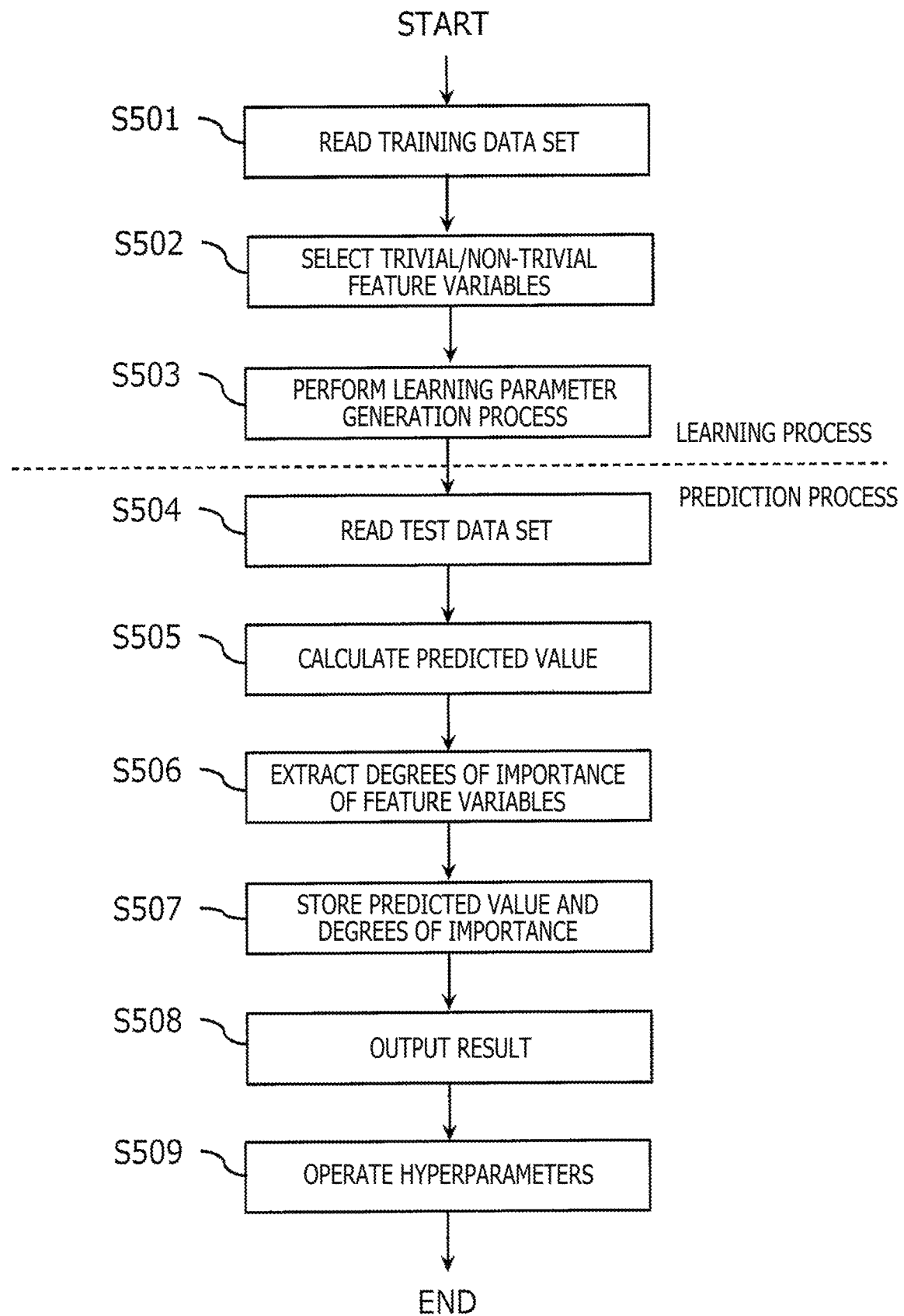
FIG. 5 is a flowchart depicting an example of a data analysis process procedure by the data processing apparatus according to the first embodiment.

FIG. 5 is a flowchart describing an example of a data analysis process procedure by the data analysis apparatus 300 according to the first embodiment. The data analysis apparatus 300 reads, by the selection section 411, a training data set from the data storage section 401 (Step S501), and then selects, by the selection section 411, the trivial feature variables and the non-trivial feature variables from among the training data set (Step S502).

The data analysis apparatus 300 then generates the weight parameters $w_n$ using the loss function L of Equation (2) or (5) in such a manner that the error between the predicted value $y_n$ obtained by giving the feature variables $x_{d,n}$ of the training data set and the correct label $t_n$ is minimum (Step S503). Steps S501 to S503 correspond to the learning process.

The data analysis apparatus 300 reads, by the prediction section 414, a test data set from the data storage section 401 (Step S504). The data analysis apparatus 300 calculates the predicted value $y_n$ by giving the feature variables $x_{d,n}$ of the test data set to the prediction model for which the weight parameters $w_n$ are set to the prediction expression of Equation (1) or (4) (Step S505).

The data analysis apparatus 300 extracts, by the degree-of-importance calculation section 415, the degrees of importance of the feature variables (Step S506). Next, the data analysis apparatus 300 saves a combination of the predicted value $y_n$ and the degrees of importance in the result storage section 403 (Step S507). The data analysis apparatus 300 then outputs, by the output section 416, the combination of the predicted value $y_n$ and the degrees of importance (Step S508).

Further, the data analysis apparatus 300 operates, by the operation section 413, the hyperparameters, that is, the loss coefficient λ, the first regularization coefficient μ related to the weight parameters $w_{k,n}$ of the trivial feature variables $x_{k,n}$, the second regularization coefficient ν related to the weight parameters $w_{h,n}$ of the non-trivial feature variables $x_{h,n}$, and the elastic coefficient α (Step S509).

<Examples of Display Screen>

Figure 6:
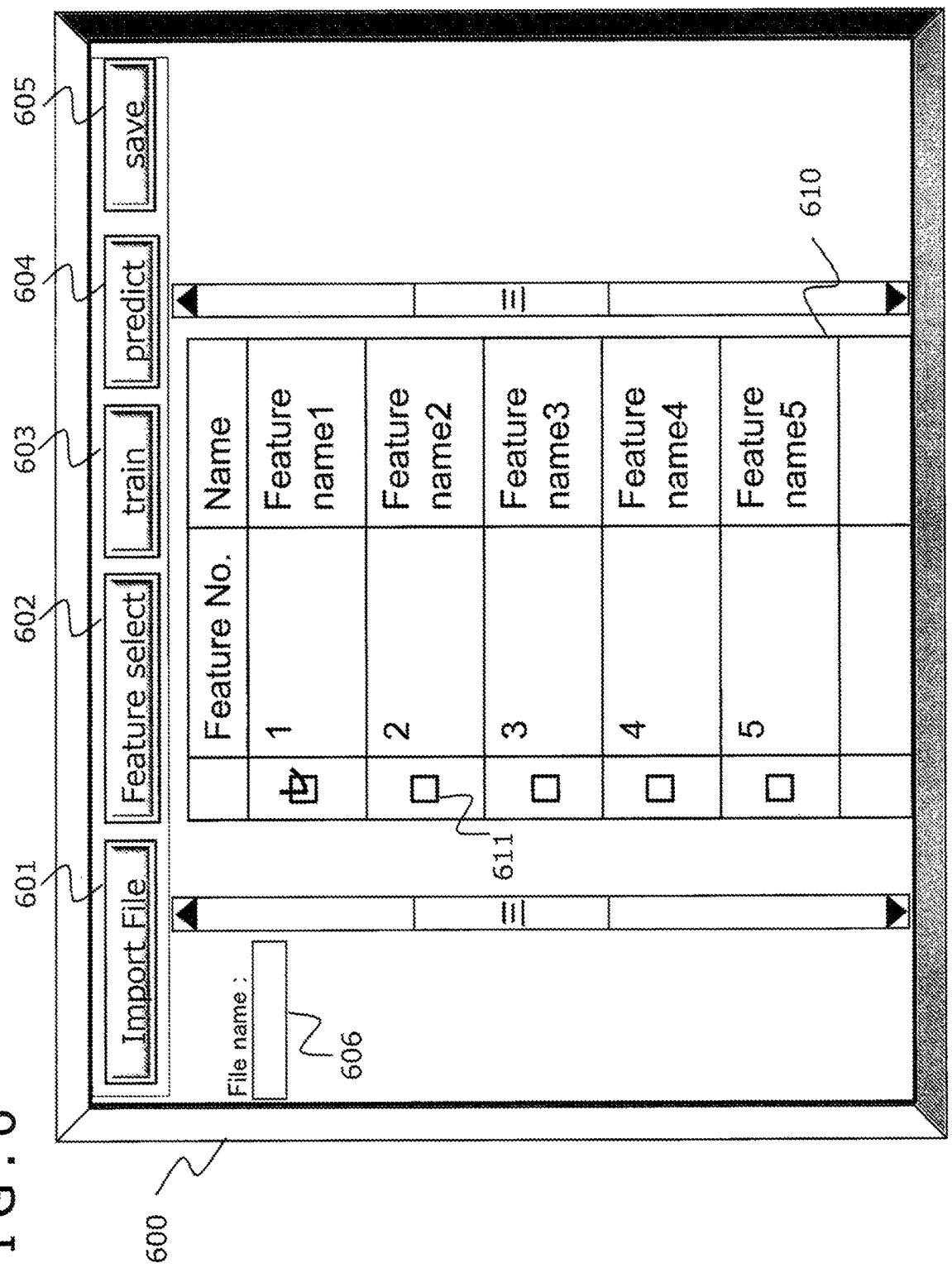
FIG. 6 is an explanatory diagram depicting a display example 1 of a display screen.

FIG. 6 is an explanatory diagram depicting a display example 1 of a display screen. A display screen 600 is displayed on a display that is an example of the output device 304 in the data analysis apparatus 300 or a display of a computer to which the output section 416 outputs data.

The display screen 600 includes an import file button 601, a feature select button 602, a train button 603, a predict button 604, a save button 605, a file name box 606, and a select screen 610.

Upon detecting depression of the import file button 601 by a user's operation, the data analysis apparatus 300 selects the training data for use by the learning section 412, the test data for use by the prediction section 414, a determined optimum model, a prediction result, the degrees of importance, and the like by a user's operation. Names of the selected data are displayed in the file name box 606. Subsequently, upon depression of the Feature select button 602 by a user's operation, the data analysis apparatus 300 displays, by the selection section 411, the select screen 610 of the feature variables.

A user places a checkmark in each feature variable to be selected as the trivial feature variable, for example, in a checkbox 611. The selection section 411 selects the feature variables in the checked checkboxes as the trivial feature variables. When the selection of the feature variables is over and learning is started, the user depresses the train button 603. The learning section 412 thereby starts the learning process. Subsequently, the user selects test data and depresses the predict button 604. The prediction section 414 thereby starts the prediction process.

Figure 7:
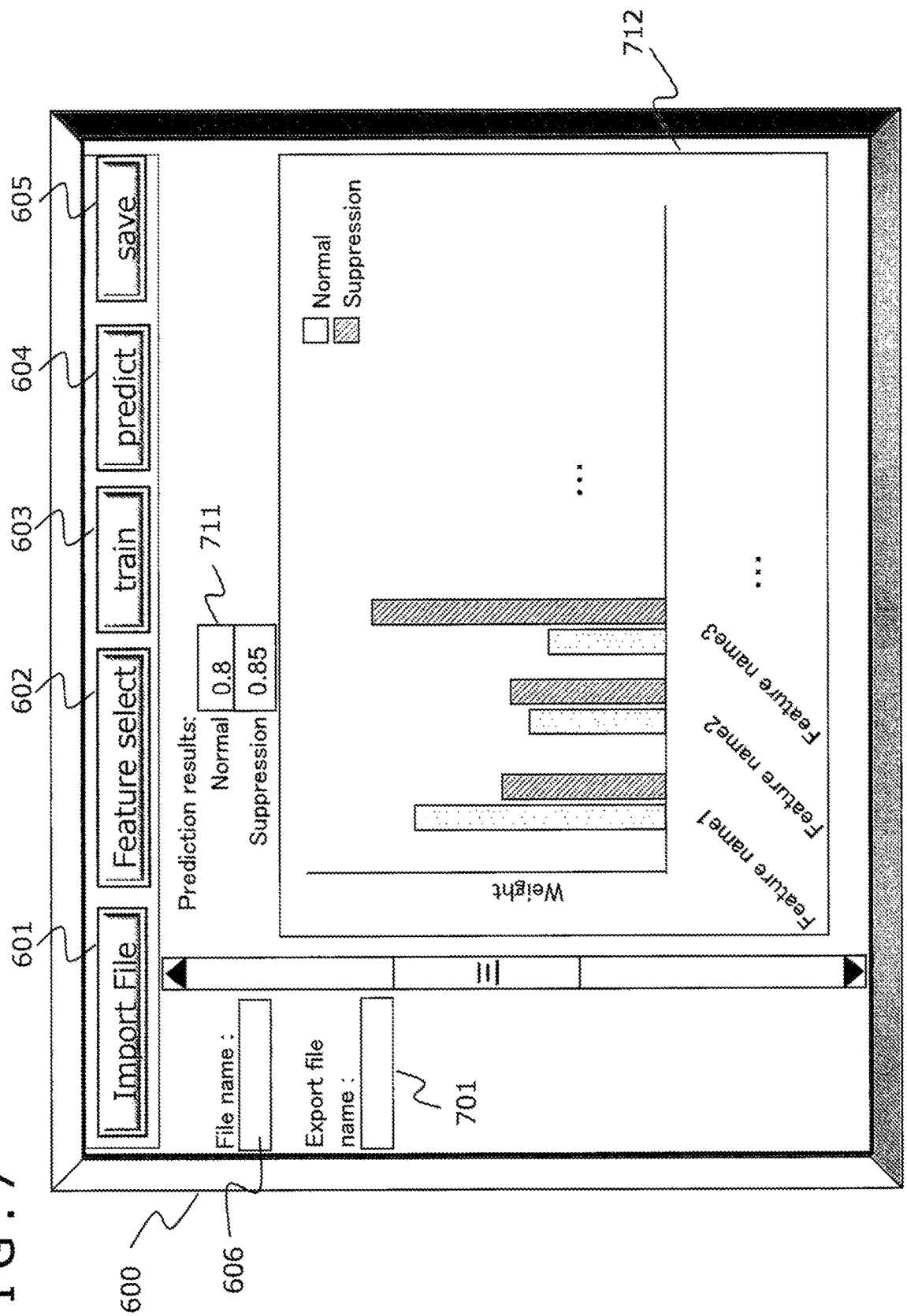
FIG. 7 is an explanatory diagram depicting a display example 2 of the display screen.

FIG. 7 is an explanatory diagram depicting a display example 2 of the display screen. On the display screen 600, a degree of importance of the predicted value $y_n$, and a suppression effect of the weight parameters $w_{k,n}$ of each trivial feature variable $x_{k,n}$ are displayed after end of the prediction process. The predicted value $y_n$ is displayed in an accuracy display area 711. In addition, the weight parameter $w_{d,n}$ of each feature variable $x_{d,n}$ in ordinary prediction and a result of suppressing the weight parameter $w_{k,n}$ of each trivial feature variable $x_{k,n}$ by the operation section 413 are displayed side by side in a suppression effect display area 712.

While a comparison between the ordinary prediction and the suppression result is displayed in FIG. 7, only the suppression result may be displayed. Furthermore, a value displayed as the weight parameter $w_{k,n}$ of each trivial feature variable $x_{k,n}$ may be a value of the actual weight parameter $w_{k,n}$, a normalized value in each sample n, or an average value obtained by normalizing the value in each sample n and then adding up the normalized values in all samples 1 to N or by a total cross-validation.

In a case of saving these analysis results, the user depresses the save button 605. A screen on which a memory space in which the analysis results are to be saved can be designated is thereby displayed. Upon user's designating the memory space and depressing an execution button, the analysis results are saved in the designated memory space. The memory space in which the analysis results are saved is displayed in an export file name box 701 or the like.

In this way, according to the first embodiment, using the loss function for setting different penalties between the trivial feature variables and the non-trivial feature variables in the machine learning accountable for grounds for prediction makes it possible to realize prediction while suppressing the degrees of contribution (weight parameters $w_{k,n}$) of the trivial feature variables $x_{k,n}$ to prediction and making active use of the other non-trivial feature variables $x_{h,n}$. This makes it possible to extract unknown feature variables that may be feature variables not discovered yet in academic findings or the like contributing to prediction.

Second Embodiment

A second embodiment will be described. In the first embodiment, the two feature variable groups, that is, a trivial feature variable group and a non-trivial feature variable group are selected. The second embodiment is an example of increasing the number of groups of feature variables for operating the degrees of contribution such as trivial feature variables, non-trivial feature variables, and trivial feature variables not contributing to prediction, compared with the number of feature variable groups in the first embodiment. It is noted that the same constituent elements as those in the first embodiment are denoted by the same reference characters and are not often described.

The selection section 411 selects trivial feature variables, in which contributing to prediction is trivial, and feature variables, in which contributing to prediction is non-trivial, as well as trivial feature variables, in which not contributing to prediction is trivial, from the set of feature variables $x_{d,n}$ as the training data. The selection section 411 may select, as the trivial feature variables, feature variables suggested to be academically important in the accumulation of findings made by developers or engineers so far, documents, or the like.

In addition, the selection section 411 may select, as the trivial feature variables not contributing to prediction, feature variables suggested to be not academically important in the accumulation of findings made by developers or engineers so far, documents, or the like. Furthermore, the selection section 411 may select, as the non-trivial feature variables, remaining feature variables $x_{d,n}$ that are not selected as the trivial feature variables and the trivial feature variables not contributing to prediction from among the set of feature variables $x_{d,n}$. In FIGS. 1 and 2, for example, the selection section 411 selects the feature variable $x_{1,n}$ as the trivial feature variable, selects the feature variable $x_{2,n}$ and $x_{3,n}$ as the non-trivial feature variable, and selects the feature variable $x_{3,n}$ as the trivial feature variable not contributing to prediction.

The operation section 413 operates the hyperparameters in the degree-of-contribution operation term for increasing the degrees of contribution of the non-trivial feature variables to prediction and reducing the degrees of contribution of the trivial feature variables to prediction and the degrees of contribution of the trivial feature variables not contributing to prediction. The degree-of-contribution operation term $R_P(w^t_n)$ is replaced by a degree-of-contribution operation term $R_1(w_n)$ of the following Equation (10) with the norm dimension p=1.

[Expression 8]

Equation (10)

$$R_1(w_n) = \frac{\lambda}{N} \sum_{n=1}^{N} \left( \mu \sum_{k \in T} |w_{k,n}| + v \sum_{h \in U} |w_{h,n}| + \tau \sum_{l \in V} |w_{l,n}| \right) \quad (7)$$

Equation (10) is an example of the degree-of-contribution operation term $R_1(w_n)$ of the L1 norm. $\tau$ is a third regularization coefficient related to weight parameters $w_{1,n}$ of trivial feature variables $x_{1,n}$ in which not contributing to prediction is trivial. $\tau$ is also a hyperparameter. l indicates a number of the trivial feature variables, in which not contributing to prediction is trivial, and V is the number of the non-trivial feature variables. The degree-of-contribution operation term $R_1(w_n)$ of Equation (10) is added to the error function $E(w_n^t)$ by the learning section 412 as depicted in Equation (5). The learning section 412 thereby calculates the loss function $L(w_n^t)$ and updates the weight parameters $w_{k,n}$, $w_{h,n}$, and $w_{1,n}$.

By doing so, it is possible to produce effects of preventing growth of the weight parameters $w_{k,n}$ of the trivial feature variables $x_{k,n}$ and the weight parameters $w_{1,n}$ of the trivial feature variables $x_{1,n}$, in which not contributing to prediction is trivial, and of obtaining a sparse model.

Moreover, the degree-of-contribution operation term $R_P(w^t_n)$ of Equation (6) may be replaced by a degree-of-contribution operation term $R_2(w_n)$ of the following Equation (11) with the norm dimension p=2.

[Expression 9]

Equation (11)

$$R_2(w_n) = \frac{\lambda}{N} \sum_{n=1}^{N} \left( \mu \sum_{k \in T} \|w_{k,n}\| + v \sum_{h \in U} \|w_{h,n}\| + \tau \sum_{l \in V} \|w_{l,n}\| \right) \quad (11)$$

Adding the degree-of-contribution operation term $R_2(w_n)$ to the error function $E(w_n)$ by the learning section 412 makes it possible to produce effects of preventing growth of the weight parameters $w_{k,n}$ of the trivial feature variables $x_{k,n}$ and the weight parameters $w_{1,n}$ of the trivial feature variables, in which not contributing to prediction is trivial, and of suppressing overfitting to obtain a smooth prediction model.

Furthermore, the degree-of-contribution operation term $R_P(w^t_n)$ of Equation (6) may be replaced by a degree-of-contribution operation term $R_{els}(w_n)$ of the following Equation (12).

[Expression 10]

Equation (12)

$$R_{els}(w_n) = \frac{\lambda}{N} \sum_{n=1}^{N} \left( \mu \sum_{k \in T} \{\alpha \|w_{k,n}\| + (1-\alpha)|w_{k,n}|\} + v \sum_{h \in U} \{\beta \|w_{h,n}\| + (1-\beta)|w_{h,n}|\} + \tau \sum_{l \in V} \{\gamma \|w_{l,n}\| + (1-\gamma)|w_{l,n}|\} \right) \quad (12)$$

Equation (12) is an equation of an elastic net of linear combination between the L1 norm and the L2 norm of each weight vector $w_n$, and is a degree-of-contribution operation term obtained by the linear combination between Equations (10) and (11). In Equation (12), $\alpha$ ($0.0 \le \alpha \le 1.0$) is the elastic coefficient. The elastic coefficient $\alpha$ is also a hyperparameter.

Adding the degree-of-contribution operation term $R_{els}(w_n)$ to the error function $E(w_n)$ makes it possible to produce an effect of preventing the growth of the weight parameters $w_{k,n}$ of the trivial feature variables $x_{k,n}$ and the weight parameters $w_{1,n}$ of the trivial feature variables $x_{1,n}$, in which not contributing to prediction is trivial, to obtain a sparse model as depicted in Equation (10) and an effect of suppressing overfitting to obtain a smooth model as depicted in Equation (11).

Furthermore, the operation section 413 operates the first regularization coefficient μ, the second regularization coefficient ν, and the third regularization coefficient τ in such a manner that a sum of the first regularization coefficient μ, the second regularization coefficient ν, and the third regularization coefficient τ is, for example, 1.0. The operation section 413 operates the first regularization coefficient μ, the second regularization coefficient ν, and the third regularization coefficient τ in such a manner the first regularization coefficient μ and the third regularization coefficient τ are greater than the second regularization coefficient ν. The operation section 413 may operate the first regularization coefficient μ, the second regularization coefficient ν, and the third regularization coefficient τ on condition that one of the first and third regularization coefficients μ and τ is greater than 0.5.

By doing so, with growth of the weight parameters $w_{k,n}$ of the trivial feature variables $x_{k,n}$ and the weight parameters of the trivial feature variables $x_{1,n}$ in which not contributing to prediction is trivial, regularization terms of the first regularization coefficient μ and the third regularization coefficient τ grow. It is, therefore, possible to suppress the weight parameters $w_{k,n}$ of the trivial feature variables $x_{k,n}$ and the weight parameters $w_{1,n}$ of the trivial feature variables $x_{1,n}$, in which not contributing to prediction is trivial, and grow the values of the weight parameters $w_{h,n}$ of the non-trivial feature variables $x_{h,n}$, compared with the case of not using the degree-of-contribution operation term $R_P(w^t_n)$. Furthermore, a range of the value of one of the first regularization coefficient μ and the third regularization coefficient τ may be set, for example, to be equal to or greater than 0.7.

Moreover, the selection section 411 may comprehensively change feature variables designated as trivial feature variables and select the trivial feature variables on the basis of a result of carrying out the first embodiment. Specifically, the selection section 411 selects, for example, only one trivial feature variable, carries out the first embodiment, and obtains the prediction accuracy (AUC, a determination coefficient $r^2$, or the like) and the degree of importance.

Subsequently, the data analysis apparatus 300 changes the only feature variable to be selected and carries out the first embodiment by as much as the number of all feature variables. Furthermore, the data analysis apparatus 300 increases the number of designated feature variables to two, similarly carries out the first embodiment by combinations of all feature variables, further increases the number of designated feature variables, and carries out the first embodiment in all patterns in which feature variables can be selected as the trivial feature variables. Subsequently, in a case in which the prediction accuracy is equal to or higher than a threshold, the selection section 411 lists up the feature variables selected as the trivial feature variables and the combinations of the feature variables, and selects the trivial feature variables from among the feature variables and the combinations.

The listed feature variables can be interpreted as important feature variables for realizing accurate prediction. At this time, the data analysis apparatus 300 may select the feature variables in descending order of frequency of appearance in the listed feature variables and the combinations of the feature variables in sequence. The selection section 411 can thereby dynamically select the trivial feature variables and the non-trivial feature variables.

Moreover, as a result of carrying out the first embodiment in all patterns in which feature variables can be selected as trivial feature variables by the data analysis apparatus 300, the selection section 411 may refer to the obtained degrees of importance and select the feature variables having higher degrees of importance as trivial feature variables although the feature variables are designated as the trivial feature variables. It can be interpreted that the feature variables having higher degrees of importance despite suppression of the degrees of contribution to prediction are the important feature variables for realizing accurate prediction. At this time, the data analysis apparatus 300 may select the feature variables in descending order of frequency of appearance in the feature variables listed as those having the degrees of importance equal to or higher than a threshold and the combinations of the feature variables in sequence although the feature variables are designated as the trivial feature variables. The selection section 411 can thereby dynamically select the trivial feature variables and the non-trivial feature variables.

In this way, according to the second embodiment, using the loss function $L(w_n^t)$ for setting different penalties among the trivial feature variables, the non-trivial feature variables, and the trivial feature variables, in which not contributing to prediction is trivial, in the machine learning accountable for grounds of prediction makes it possible to realize prediction while suppressing the degrees of contribution of the trivial feature variables to prediction and those of the trivial feature variables, in which not contributing to prediction is trivial, and making active use of the non-trivial feature variables. This makes it possible to extract unknown feature variables that may be feature variables not discovered yet in academic findings or the like despite contribution to prediction.

Third Embodiment

A third embodiment will be described. The third embodiment is an example related to a method of selecting trivial feature variables and non-trivial feature variables by the selection section 411. It is noted that the same constituent elements as those in the first and second embodiments are denoted by the same reference characters and are not often described.

In the first and second embodiments, the selection section 411 designates the trivial feature variables from among the feature variables already indicated to be academically important in documents or the like or the accumulation of findings made by developers and engineers so far in selecting the trivial feature variables. In the third embodiment, the selection section 411 selects trivial feature variables on the basis of degrees of actual contributions to prediction. To describe a selection method based on the degree of contributing to prediction, as an example of predicting Boston house prices, a performance verification is carried out on the basis of data used in Harrison, D. and Rubinfeld, D. L. (1978) Hedonic prices and the demand for clean air. J. Environ. Economics and Management 5, 81-102.

FIG. 8 is an explanatory diagram depicting a feature variable vector Features and ground truth data Target. In an experiment, prediction is applied in a case of using 10-fold cross validation and all thirteen feature variables in (1) to (13), two feature variables having the degrees of importance accounting for top 20% are selected as the trivial feature variables from among the feature variables contributing to prediction, and the first embodiment is carried out.

Figure 9:
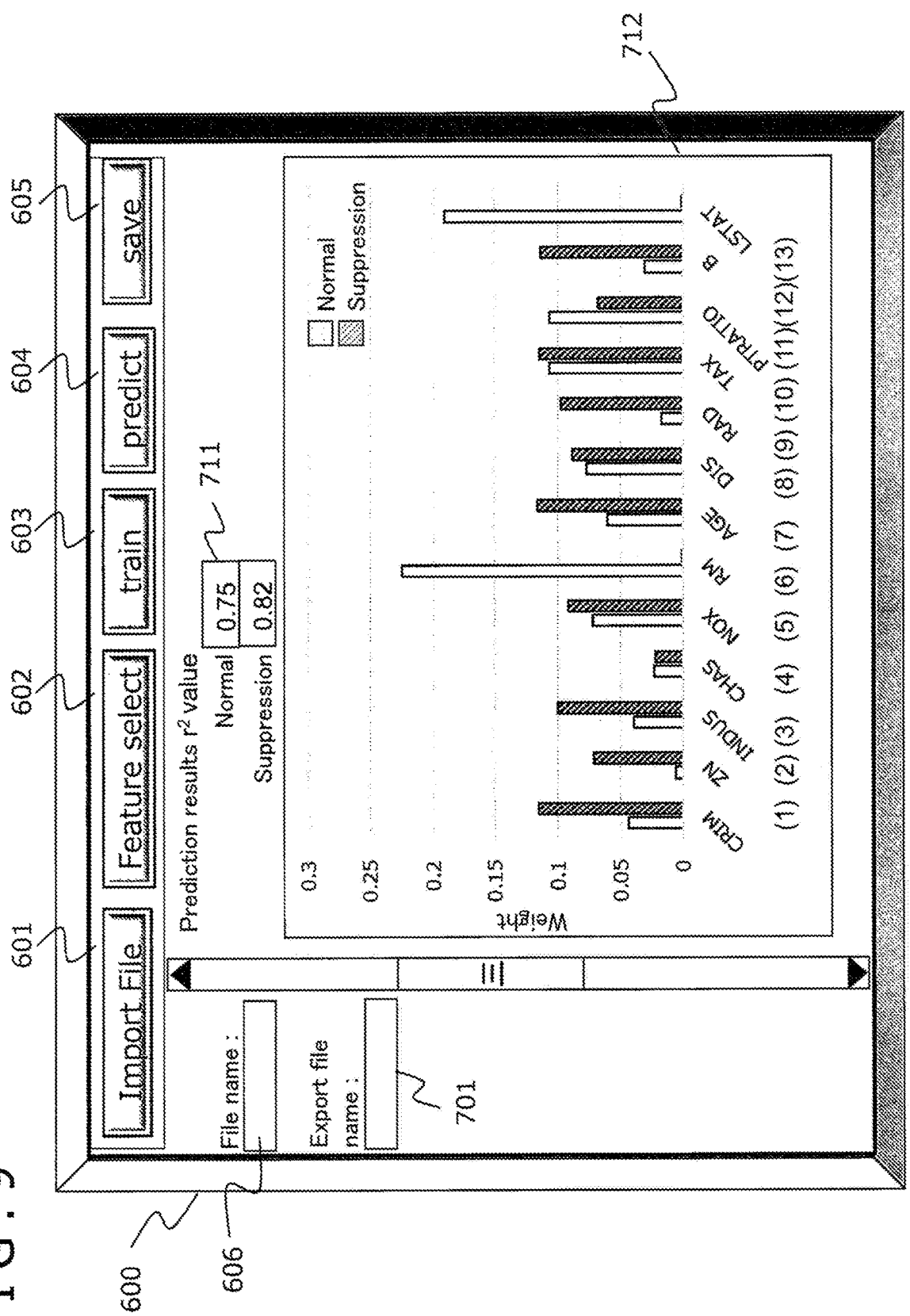
FIG. 9 is an explanatory diagram depicting an experimental result.

FIG. 9 is an explanatory diagram depicting an experimental result. A prediction result by the data analysis apparatus 300 in a case in which the operation section 413 does not operate the hyperparameters is a Normal graph, while a prediction result by the data analysis apparatus 300 in a case in which the operation section 413 operates the hyperparameters is a Suppression graph. Since the determination coefficient $r^2$ (=0.75) in the Normal graph exceeds 0.7, the data analysis apparatus 300 calculates the degrees of importance with respect to degrees of contribution to accurate prediction.

The selection section 411 compares a magnitude of the weight vector $w_n$ among the feature variables, and selects the feature variables (6) and (13) that are top two feature variables as trivial feature variables. The operation section 413 operates the first regularization coefficient $\mu$ related to the weight parameters $w_{k,n}$ of the trivial feature variables $x_{k,n}$ to be equal to or greater than 0.5 using Equation (7). The learning section 412 generates learning parameters (weight vector $w_n$) in the learning process. The selection section 411 compares again the magnitude of the weight vector $w_n$ among the feature variables.

Since the determination coefficient $r^2$(=0.82) exceeds 0.7, it is understood that prediction is carried out with high prediction accuracy even after operating the first regularization coefficient $\mu$. Comparison of the magnitude of the weight vector $w_n$ in Normal prediction with the magnitude of the weight vector $w_n$ in Suppression prediction indicates that the weight vector $w_n$ of the feature variables (6) and (13) can be suppressed and that the magnitude of the weight vector $w_n$ small in the Normal prediction can be grown.

While the feature variables having the top 20% degrees of importance among the feature variables contributing to prediction are selected as the trivial feature variables in the third embodiment, a percentage may be 50% or the like or the number of the trivial feature variables may be determined in advance. Furthermore, while the selection method based on the degrees of contribution to prediction has been described in the third embodiment, the selection section 411 may select the trivial feature variables on the basis of a prediction result. The selection section 411 may select the trivial feature variables until the prediction result indicating, for example, that the determination coefficient $r^2$ or the AUC is equal to or smaller than 0.8.

In this way, according to the third embodiment, using the loss function for setting different penalties between the trivial feature variables and the non-trivial feature variables in the machine learning accountable for grounds for prediction makes it possible to realize prediction while suppressing the degrees of contribution (weight parameters $w_{k,n}$) of the trivial feature variables $x_{k,n}$ to prediction and making active use of the other non-trivial feature variables $x_{h,n}$. This makes it possible to extract unknown feature variables that may be feature variables not discovered yet in academic findings or the like and contributing to prediction.

Fourth Embodiment

A fourth embodiment will be described. The fourth embodiment is an example related to a method of determining the first regularization coefficient $\mu$ of the trivial feature variables and the second regularization coefficient $\nu$ of the non-trivial feature variables by the operation section 413. It is noted that the same constituent elements as those in the first embodiment are denoted by the same reference characters and are not often described.

In the first embodiment, the operation section 413 determines the regularization term of the trivial feature variables and that of the non-trivial feature variables on condition that the range of the value of each of the first and second regularization coefficients $\mu$ and $\nu$ is set in such a manner that the sum of the first regularization coefficient $\mu$ of the trivial feature variables and the second regularization coefficient $\nu$ of the non-trivial feature variables is equal to 1 and that the first regularization coefficient $\mu$ of the trivial feature variables is greater than 0.5. In the fourth embodiment, an example of generating learning parameters having highest prediction accuracy in a designated range of values on the above condition by the learning section 412 will be described.

Figure 10:
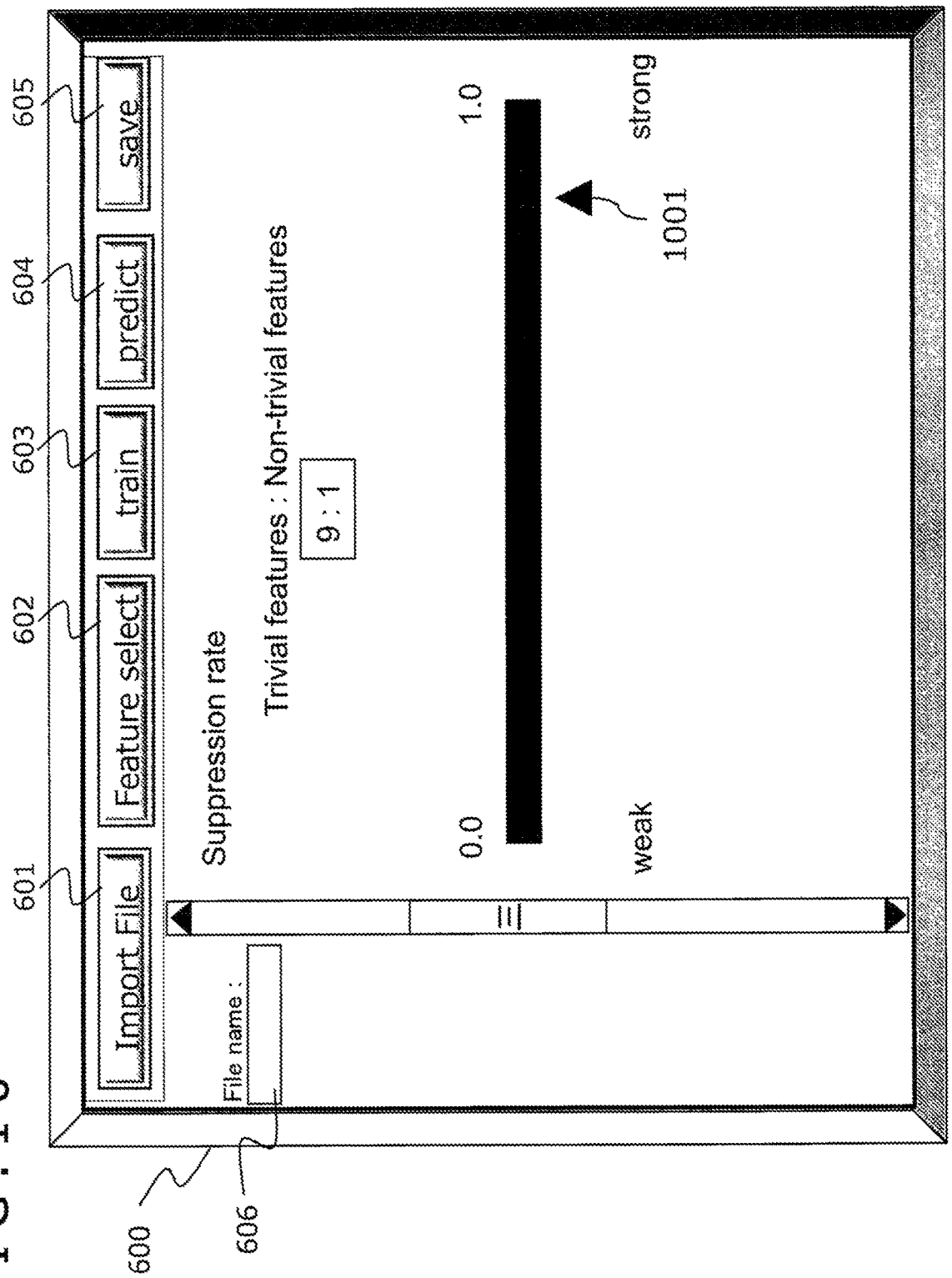
FIG. 10 depicts an example of screen display of a data analysis apparatus according to a fourth embodiment.

FIG. 10 depicts an example of screen display of the data analysis apparatus 300 according to the fourth embodiment. As depicted in FIG. 10, a slider 1001 that is an example of a user interface and that adjusts values of the first regularization coefficient $\mu$ and the second regularization coefficient $\nu$ may adjust the values of the first regularization coefficient $\mu$ of the trivial feature variables and the second regularization coefficient $\nu$ of the non-trivial feature variables in determining the first regularization coefficient $\mu$ and the second regularization coefficient $\nu$. Furthermore, the values of the first regularization coefficient $\mu$ and the second regularization coefficient $\nu$ may be subsequently changed again after confirming the magnitude of the weight vector $w_n$ as depicted in FIG. 7.

Moreover, as a method of determining values, the user may set the first regularization coefficient $\mu$ of the trivial feature variables to a fixed value such as 0.9 or values in a desired balance may be selected on the basis of a degree of suppression of the weight vector $w_n$ and the prediction accuracy.

In this way, according to the fourth embodiment, using the loss function for setting different penalties between the trivial feature variables and the non-trivial feature variables in the machine learning accountable for grounds for prediction makes it possible to realize prediction while suppressing the degrees of contribution (weight parameters $w_{k,n}$) of the trivial feature variables $x_{k,n}$ to prediction and making active use of the other non-trivial feature variables $x_{h,n}$. This makes it possible to extract unknown feature variables that may be feature variables not discovered yet in academic findings or the like and contributing to prediction.

Fifth Embodiment

In a fifth embodiment, an example of calculating degrees of importance used in the first to fourth embodiments will be described. It is noted that the same constituent elements as those in the first to fourth embodiments are denoted by the same reference characters and are not often described.
<Example of Reallocation of Feature Vectors>

While artificial intelligence (AI) has a capability of solving linearly inseparable problems, it is unclear why the AI made such a judgment. A machine learning approach such as deep learning, in particular, is high in prediction accuracy but low in accountability. For example, in a case in which the AI output a diagnosis result that "prone to catch a cold" to a certain patient, a doctor is unable to answer a question why the AI obtained such a result. If the AI can make a judgment up to a cause of a symptom, the doctor can give proper treatment to the patient.

FIGS. 11A and 11B are explanatory diagrams depicting an example of reallocation of feature variable vectors. In (A), in a feature variable space SP1, a plurality of feature variable vectors $x_n$ (n=1, 2, . . . , N, where N is the number of images) are present. The plurality of feature variable vectors $x_n$ are discriminated as correct labels La and Lb by, for example, a nonlinear prediction model PM1. In (B), in a feature space SP2, a plurality of feature variable vectors $x_n$ are present.

The plurality of feature variable vectors $x_n$ are discriminated as correct labels La and Lb by, for example, a nonlinear prediction model PM2.

In (A), the machine learning approach such as the deep learning learns linear regression anew for explaining the prediction model PM1 that is a discrimination result. Specifically, the machine learning approach executes, for example, a retrofitted process of obtaining the prediction model PM1 and then locally performing straight-line approximation on the prediction model PM1. However, it is unclear in such a retrofitted process whether a straight-line approximated local part of the prediction model PM1 can correctly explain the feature variable vectors $x_n$. Furthermore, and more importantly, executing logistic regression called straight-line approximation makes it necessary to execute machine learning twice after all.

Since the prediction model PM2 in (B) is linear, referring to an inclination of the prediction model PM2 makes it possible to grasp with which parameter in the feature variable space SP2 each of the feature variable vectors $x_n$ is weighted and to correctly explain the feature variable vectors $x_n$. In the first embodiment, the plurality of feature variable vectors $x_n$ in the feature variable space SP1 are reallocated to the other feature variable space SP2 without obtaining the nonlinear prediction model PM1 like (A) for the plurality of feature vectors $x_n$. The linear prediction model PM2 is thereby obtained; thus, it is possible to grasp with which parameter in the feature variable space SP2 each of the feature variable vectors $x_n$ is weighted and to correctly explain each feature variable vector $x_n$ in response to the degree of importance.

In other words, the user can grasp which factor (feature) included in the feature variables $x_n$ contributes to the prediction result for every sample (for example, for every patient) with the feature variable vectors $x_n$; thus, it is easy to explain why such a prediction result is obtained. Therefore, it is possible to improve accountability of the machine learning. According to the above example, the user can grasp why the AI output the diagnosis result of "prone to catch a cold" (for example, because of slimness) with respect to the certain patient. Furthermore, it is possible to improve efficiency of the machine learning since it is unnecessary to execute the machine learning twice as in (A). Therefore, it is possible to promptly provide an explanation described above.

<Example of Structure of Neural Network>

FIG. 12 is an explanatory diagram depicting an example of a structure of a neural network according to the fifth embodiment. A neural network 1200 has a data unit group DU, a reporting unit group RU, a harmonizing unit group HU, a reallocation unit RAU, a unifying unit UU, a decision unit DCU, and an importance unit IU.

The data unit group DU is configured such that a plurality of data units DU1 (l is a layer number and 1≤l≤L. L is the layer number of a lowest layer and L=4 in FIG. 12) are connected in series. The data unit DU1 that is a highest layer of l=1 corresponds to an input layer 1201 and the data units DU1 of l≥2 correspond to intermediate layers (also referred to as hidden layers) of the neural network 1200. Each data unit DU1 is a perceptron to which output data from the data unit DU(l-1) of a previous layer is input, in which calculation is performed using a learning parameter of the own data unit DU1, and from which output data is output.

It is noted, however, that the data unit DU1 holds the training data at a time of learning by the learning section 412. The training data means herein, for example, sample data configured with a combination $\{x_n, t_n\}$ of images $x_n$ as an example of the feature variable vector $x_n$ and the correct label $t_n$ that is a true value of the images (n=1, 2, ..., N, where N is the number of images). The images $x_n$ are data having a two-dimensional matrix structure and hereinafter handled as a d-dimensional vector (where d is an integer satisfying d≥1) obtained by raster scanning. In a case of denoting "x" for easier description, it is assumed that the vector is a one-dimensional vector obtained by raster scanning the image $x_n$ in a matrix form.

The correct label $t_n$ is a K-dimensional vector that indicates a type (for example, an animal such as dog or cat) in a one-hot representation with respect to the number of types K of the images $x_n$. In the one-hot representation, one element of the vector corresponds to the type of the images $x_n$ and 1.0 is stored in the only one element, while 0.0 is stored in all the other elements. The type (for example, a dog) corresponding to the element of 1.0 is the type that is a ground truth. It is noted that in a case in which medical images $x_n$ such as CT images, MRI images, or ultrasound images are an input, the label $t_n$ is a true value that represents a type of disease or a prognosis (good or bad) of a patient.

It is assumed that the images $x_n \in R^d$ (where $R^d$ is d-dimensional real numbers) are a feature variable vector configured with the d-dimensional real numbers $R^d$. A function $h^{l+1}_D$ that indicates the data unit DU(l+1) is expressed by the following Equation (13).

[Expression 11]

Equation (13)

$$h_D^{l+1} = f_D^l(W_D^l h_D^l) \tag{13}$$

where $h_D^l \in \mathcal{R}^{d^l}$ is an input/output vector of the data unit $W_D^l \in \mathcal{R}^{d^{l+1} \times d^l}$ is a learning parameter when l=1, $h_D^1 = x_n$ In Equation (13), an index l (integer satisfying 1≤l≤L) denotes the layer number (the same applies to the following equations). L is an integer equal to or greater than 1 and denotes a layer number of the lowest layer. $f_D^l$ on a right side is an activation function. As the activation function, any of various activation functions such as the sigmoid function, a hyperbolic tangent function (tank function), and a rectified linear unit (ReLU) function may be used. A matrix $W_D^l$ is the learning parameter of the data unit DU1. A vector $h_D^l$ on the right side is an input vector input to the data unit DU1, that is, an output vector from the data unit DU1 that is the previous layer of the data unit DU1. It is noted that the output vector $h_D^l$ from the data unit DU1 in a case in which the number of layers l=1 is $h_D^l = x_n$.

It is noted that the data unit DU1 holds the images $x_n$ that are the feature variable vector as the test data at a time of prediction by the prediction section 414.

An output vector $h_D^l$ from the data unit DU1 on the same layer is input to each reporting unit RU1 (2≤l≤L), and the reporting unit RU1 contracts the number of dimensions of the output vector $h_D^l$. A function $h^1R$ that indicates the reporting unit RU1 is expressed by the following Equation (14).

[Expression 12]

Equation (14)

$$h_R^l = \sigma(W_R^l h_D^l) \tag{14}$$

In Equation (14), a matrix $W_R^l$ is a learning parameter of the reporting unit RU1. The d-dimensional output vector $h_D^l$ from each data unit DU1 is contracted to an m-dimensional output vector $h_R^l$ by Equation (14). Further, σ is the sigmoid function.

Each harmonizing unit HU1 (2≤l≤L) is provided between each data unit DU1 on the intermediate layer and the reallocation unit RAU per data unit DU1 on the intermediate layer. The harmonizing units HU1 each convert the number of dimensions of the output data from the data unit DU1 on the intermediate layers into the same size. Therefore, pieces of the output data made to have the same number of dimensions by the harmonizing units HU1 are input to the reallocation unit RAU.

In other words, the output vector $h_D^l$ is input to each harmonizing unit HU1 from the data unit DU1 on the same layer, and the harmonizing units HU1 each convert the number of dimensions of the output vector $h_D^l$ into the same number of dimensions. A function h'H that indicates each harmonizing unit HU1 is expressed by the following Equation (15).

[Expression 13]

Equation (15)

$$h_H^l = f_H(W_H^l h_D^l) \quad (15)$$

where $W_H^l \mathcal{R}^{d^{l+1} \times d^l}$ is a learning parameter

In Equation (15), a matrix $W_H^l$ is a learning parameter of the harmonizing unit HU1. The d-dimensional output vector $h_D^l$ from the data unit DU1 is thereby converted into an m-dimensional output vector $h_H^l$. It is noted that m is a hyperparameter that determines the number of dimensions. d and m may differ from d and m in the reporting units RU1. Furthermore, $f_H$ is an activation function.

The attention unit AU calculates a weight α of each data unit DU1 using the output vector $h_R^l$ from each reporting unit RU1. A function a that indicates the attention unit AU is expressed by the following Equation (16).

[Expression 14]

Equation (16)

$$\alpha = \mathrm{softmax}(W_A h_R) \quad (16)$$

where $W_A \mathcal{R}^{(L-1) \times m}$ (m=r(L−1)) is a learning parameter

In Equation (16), a matrix $W_A$ is a learning parameter of the attention unit AU. A softmax function that is one type of activation function calculates a vector $h_R$ in dimensions equal to the number of layers (L=4 in an example of Equation (17) below). As indicated by the following Equation (17), the vector $h_R$ on the right side of Equation (16) is a vector obtained by stacking $h_R^l$ in a perpendicular direction.

[Expression 15]

Equation (17)

$$h_R = [h_R^2; \ldots; h_R^L] \quad (17)$$
example of L = 4

$$h_R^2 = [0,1,0]$$
$$h_R^3 = [0,0,1] \Rightarrow h_R = \begin{bmatrix} 0 \\ 1 \\ 0 \\ 0 \\ 0 \\ 1 \\ 1 \\ 0 \\ 0 \end{bmatrix} \begin{matrix} \}h_R^2 \\ \}h_R^3 \\ \}h_R^4 \end{matrix}$$
$$h_R^4 = [1,0,0]$$

Therefore, the matrix $W_A$ is a matrix of L rows by M columns (where M is the number of elements of the vector $h_R$). By adopting the softmax function in the attention unit AU, each element (a sum of all the elements is 1) of the vector $h_R$ with the number of layers being L represents the weight of the corresponding data unit DU1.

The reallocation unit RAU reallocates the feature variable vectors (images $x_n$) in one feature variable space to the other feature variable space. Specifically, as depicted in FIGS. 11A and 11B, for example, the prediction model obtained by a feature variable vector group in the feature variable space SP1 can be nonlinear; thus, the reallocation unit RAU transfers the feature variable vector group to the feature variable space SP2 so that a linear prediction model can be obtained in the feature variable space SP2. A function $h_T^l$ that indicates the reallocation unit RAU is expressed by the following Equation (18).

[Expression 16]

Equation (18)

$$h_T^l = f_T(h_H^l, x_n) \quad (18)$$

As the function $f_T$, the Hadamard product between the vectors, the element addition, or the like can be used. In the present embodiment, the Hadamard product is used (refer to the following Equation (19)). In Equation (19), the Hadamard product between the output vector $h_H^l$ from the harmonizing unit HU1 and the feature variable vector $x_n$ is obtained.

[Expression 17]

Equation (19)

$$h_T^l = h_H^l \odot x_n \quad (19)$$

The unifying unit UU unifies the output vector $h_T^l$ from the reallocation unit RAU with the output vector α from the attention unit AU. In other words, the unifying unit UU weights the output vector $h_T^l$ from the reallocation unit RAU with the output vector α from the attention unit AU. A function $h_U$ that indicates the unifying unit UU is expressed by the following Equation (20).

[Expression 18]

Equation (20)

$$h_U = \sum_{k=1}^{L-1} \alpha[k] h_T^{k+1} \quad (20)$$

In Equation (20), α[k] on the right side indicates an element (weight) in a k-th dimension of the output vector α of Equation (16).

The decision unit DCU decides on the predicted value $y_n$ and outputs the predicted value $y_n$ to an output layer 1203. Specifically, the decision unit DCU weights, for example, the output vector $h_U$ from the unifying unit UU with a weight vector $w_o$ that is one of the learning parameters and gives the resultant vector to the sigmoid function σ, thereby obtaining the predicted value $y_n$. A function $y_n$ that indicates the decision unit DCU is expressed by the following Equation (21). In Equation (21), t in $w_o^t$ means transpose.

[Expression 19]

$$y_n \qquad \text{Equation (21)}$$

The importance unit IU calculates a degree-of-importance vector $s_n^l$ that indicates the degree of importance of a feature variable on each layer of the neural network and outputs the degree-of-importance vector $s_n^l$ to the output layer 1203. A function $s_n^l$ that indicates the importance unit IU is expressed by the following Equation (22).

[Expression 20]

Equation (22)

$$s_n^l = \alpha[l] f_T(w_o, h_H^l) \qquad (22)$$

In Equation (22), α[l] on the right side indicates an element (weight) in the l-th layer of the output vector α of Equation (12). As the function $f_T$, the Hadamard product between the vectors, the element addition, or the like can be used, similarly to Equation (18). In the first embodiment, the Hadamard product is used. In Equation (22), the degree-of-importance vector $s_n^l$ is the Hadamard product between the weight vector $w_o$ and the output vector $h_H^l$ from the harmonizing unit HU1. The degree-of-importance vector $s^l n$ is a degree of importance of the n-th feature variable vector (image) $x_n$ on the layer l.

<Example of Functional Configuration of Data Analysis Apparatus 300>

FIG. 13 is a block diagram depicting an example of a functional configuration of the data analysis apparatus 300 according to the fifth embodiment. The data analysis apparatus 300 has the input layer 1201, the intermediate layers 1202, the output layer 1203, a conversion section 1301, a reallocation section 1302, a predicted data calculation section 1303, a degree-of-importance calculation section 1304, a setting section 1305, a unifying section 1306, and a contraction section 1307. These are an example of internal configurations of the learning section 412 and the prediction section 414.

As indicated by Equation (15), the conversion section 1301 contracts the number of dimensions d of the output vector $h_D^l$ from the DU1 (l≥2) on each intermediate layer on the basis of the output vector $h_D^l$ and the matrix $W_H^l$, and outputs the output vector $h_H^l$ after conversion. The conversion section 1301 is the harmonizing unit group HU described above.

As indicated by Equations (18) and (19), the reallocation section 1302 reallocates each feature variable vector $x_n$ in the feature variable space SP1 given to the input layer 1201 to the feature variable space SP2 on the basis of the output vector $h_H^l$ after conversion from the conversion section 1301 and the feature variable vector $x_n$. The reallocation section 1302 is the reallocation unit RAU described above.

As indicated by Equation (21), the predicted data calculation section 1303 calculates the predicted vector $y_n$ with respect to each feature variable vector $x_n$ in the feature space SP1 on the basis of a reallocation result $h_T^l$ by the reallocation section 1302 and the weight vector $w_o$. The predicted data calculation section 1303 is the decision unit DCU described above.

As indicated by Equation (22), the degree-of-importance calculation section 1304 calculates the degree-of-importance vector $s_n^l$ of the feature variable vector $x_n$ on each layer l of the intermediate layers 1202 on the basis of the output vector $h_H^l$ after conversion and the weight vector $w_o$. The degree-of-importance calculation section 1304 is the importance unit IU described above.

For example, as for the images $x_n$ that express an animal, it is assumed that an output vector $h_D^{la}$ on one layer la is a feature variable that indicates whether a contour of a face is suitable for a cat and assumed that an output vector $h_D^{lb}$ on one layer lb (≠la) is a feature variable that indicates whether a shape of an ear is suitable for the cat. In this case, referring to corresponding degree-of-importance vectors $s_n^{la}$ and $s_n^{la}$ enables a user to explain in light of which feature of the face in the images $x_n$ the data analysis apparatus 300 discriminates the animal as a cat. For example, in a case in which the degree-of-importance vector $s_n^{la}$ is low but the degree-of-importance vector $s_n^{la}$ is high, the user can explain that the data analysis apparatus 300 discriminates the animal as a cat in light of the shape of the ear in the images $x_n$. It is noted that the calculated degree-of-importance vectors $s_n^l$ are extracted by the degree-of-importance calculation section 415.

As indicated by Equations (16) and (17), the setting section 1305 sets the weight α of each intermediate layer 1202 on the basis of the output vector hip from the intermediate layer 1202 and the matrix $W_A$. The setting section 1305 is the attention unit AU described above.

As indicated by Equation (20), the unifying section 1306 unifies the reallocation result $h_T^l$ with the weight α set by the setting section 1305. The unifying section 1306 is the unifying unit UU described above. In this case, the predicted data calculation section 1303 calculates the predicted vector $y_n$ on the basis of a unifying result $h_U$ by the unifying section 1306 and the weight vector $w_o$. Furthermore, the degree-of-importance calculation section 1304 calculates the degree-of-importance vector $s_n^l$ on the basis of the weight α set by the setting section 1305, the output vector $h_H^l$ after conversion and the weight vector $w_o$.

As indicated by Equation (14), the contraction section 1307 contracts the number of dimensions d of the output vector $h_D^l$ from each intermediate layer 1202 on the basis of the output vector $h_D^l$ from the intermediate layer 1202 and the matrix $W^1 R$, and outputs the output vector $h_R^l$ after contraction. The contraction section 1307 is the reporting unit group RU described above. In this case, the setting section 1305 sets the weight α of each intermediate layer 1202 on the basis of the output vector $h_R^l$ after contraction from the contraction section 1307 and the matrix $W_A$.

In a case in which the training data that contains each feature variable vector $x_n$ in the feature space SP1 and the correct label $t_n$ with respect to the predicted vector $y_n$ is given, the learning section 412 optimizes the matrix $W_D^l$ that is a first learning parameter, the matrix $W^1_H$ that is a second learning parameter, the weight vector $w_o$ that is a third learning parameter, the matrix $W_A$ that is a fourth learning parameter, and the matrix $W_R^l$ that is a fifth learning parameter using the predicted vector $y_n$ and the correct label $t_n$ in such a manner, for example, that a cross entropy between the correct label $t_n$ and the predicted value $y_n$ becomes a minimum.

The prediction section 414 sets the optimized learning parameters to the first neural network 1200 and gives each feature variable vector x'$_n$ as the test data to the input layer 1201, thereby causing the predicted data calculation section 1303 to calculate a predicted vector y'$_n$.

In this way, according to the fifth embodiment, reallocating each feature variable vector x$_n$ as the sample data in advance makes it possible to calculate the degree of importance of each feature variable even if the neural network is multi-layered, and to realize accountability per sample (feature variable vector x$_n$) with high accuracy and with high efficiency. Moreover, since the linear prediction model is obtained by reallocating each sample (feature variable vectors x$_n$) in advance, it is possible to calculate the predicted value with high accuracy and with low load at times of learning and prediction.

As described so far, according to the fifth embodiment, the data analysis apparatus 300 has the conversion section 1301, the reallocation section 1302, and the degree-of-importance calculation section 1304. Therefore, the linear prediction model is obtained by reallocating the feature variable vector (x$_n$, x'$_n$) in advance; thus, it is possible to calculate the predicted value with high accuracy and with low load at times of learning and prediction. Furthermore, it is possible to grasp features possessed by the feature variable vector (x$_n$, x'$_n$) by the degree of importance of every layer l from the degree-of-importance calculation section 1304. It is thereby possible to realize accountability about the feature variable vector (x$_n$, x'$_n$) given to the neural network as an object to be analyzed with high accuracy and with high efficiency.

Moreover, the data analysis apparatus 300 has the predicted data calculation section 1303; thus, it is possible to realize accountability about the reason for obtaining the prediction result (y$_n$, y'$_n$) from the neural network as an object to be analyzed with respect to the feature variable vector (x$_n$, x'$_n$) with high accuracy and with high efficiency.

Furthermore, the data analysis apparatus 300 has the setting section 1305 and the unifying section 1306; thus, the predicted data calculation section 1303 can calculate the prediction result based on the reallocation result with high accuracy.

Moreover, the data analysis apparatus 300 has the contraction section 1307; thus, it is possible to improve efficiency of data analysis by contraction of dimensions.

Furthermore, the data analysis apparatus 300 can construct a high accuracy prediction model by learning of the learning parameters.

Since the degree of importance is obtained per feature variable, the selection section 411 can select the non-trivial feature variables on the basis of the degrees of importance.

As described so far, the data analysis apparatus 300 described above can extract unknown feature variables that may be feature variables not discovered yet in academic findings or the like and contributing to prediction by increasing the degrees of contribution of the non-trivial feature variables to prediction, reducing the degrees of contribution of the trivial feature variables, and minimizing a reduction in prediction accuracy in the machine learning accountable for grounds for prediction.

The present invention is not limited to the embodiments described above and encompasses various modifications and equivalent configurations within the meaning of the accompanying claims. For example, the embodiments have been described above in detail for describing the present invention so that the present invention is easy to understand, and the present invention is not always limited to the embodiments having all the described configurations. Furthermore, apart of configurations of one embodiment may be replaced by configurations of the other embodiment. Moreover, the configurations of the other embodiment may be added to the configurations of the one embodiment. Further, for part of the configurations of each embodiment, addition, deletion, or replacement may be made of the other configurations.

Moreover, a part of or all of the configurations, the functions, the processing sections, processing means, and the like described above may be realized by hardware by being designed, for example, as an integrated circuit, or may be realized by software by causing the processor to interpret and execute programs that realize the functions.

Information in programs, tables, files, and the like for realizing the functions can be stored in a storage device such as a memory, a hard disk, or a solid state drive (SSD), or in a recording medium such as an integrated circuit (IC) card, a secure digital (SD) card, or a digital versatile disk (DVD).

Furthermore, control lines or information lines considered to be necessary for the description are illustrated and all the control lines or the information lines necessary for implementation are not always illustrated. In actuality, it may be contemplated that almost all the configurations are mutually connected.

What is claimed is:

1. A data analysis apparatus comprising:
a processor configured to execute a machine learning program including a learning process and a prediction process, wherein, in the learning process, learning parameters are calculated in such a manner that an error between a predicted value obtained from a feature vector variable that is an input and a true value is minimum and, in the prediction process, a new predicted value is calculated from data not used for learning which are test data; and
a storage device that stores the program, wherein
the processor is configured to execute, within the learning process:
a selection process for selecting, from a set of feature variables that are training data, a first feature variable group that is a trivial feature variable group, wherein trivial feature variables are nearly equivalent to the true value of the predicted value, and a second feature variable group with feature variables other than the first feature variable qroup;
an operation process for varying a first regularization coefficient related to a first weight parameter group corresponding to the first feature variable group among a set of weight parameters configuring a prediction model in such a manner that a loss function is larger, and varying a second regularization coefficient related to a second weight parameter group corresponding to the second feature variable group among the set of weight parameters configuring the prediction model in such a manner that the loss function is smaller, wherein the loss function relates to a difference between a prediction result output in a case of inputting the set of feature variables to the prediction model and ground truth data corresponding to the feature variables; and
a weight parameter learning process for learning the set of weight parameters of the prediction model in such a manner that the loss function is minimum as a result of varying a first regularization coefficient and a second regularization coefficient by the operation process; and
the processor is further configured to execute, within the prediction process, calculating the prediction result and prediction accuracy of the prediction result based on the prediction result and the ground truth data, and in the operation process, the processor is configured to re-operate the first regularization coefficient and the second regularization coefficient in a case in which the prediction accuracy is equal to or lower than predetermined prediction accuracy, and in the weight parameter learning process, the processor is configured to re-learn the set of weight parameters of the prediction model in such a manner that the loss function is minimum as a result of re-operating the first regularization coefficient and the second regularization coefficient by the operation process.

2. The data analysis apparatus according to claim 1, wherein the processor is configured to:

execute a degree-of-importance calculation process for calculating a degree of importance of each of the feature variables on a basis of the set of weight parameters, and in the selection process, the processor is configured to select the first feature variable group and the second feature variable group on a basis of the degree of importance calculated by the degree-of-importance calculation process.

3. The data analysis apparatus according to claim 2, wherein in the degree-of-importance calculation process, the processor is configured to calculate a degree of importance of each first feature variable in the first feature variable group and a degree of importance of each second feature variable in the second feature variable group in such a manner that the degree of importance of the first feature variable is lower than the degree of importance of the second feature variable.

4. The data analysis apparatus according to claim 2, wherein the processor is configured to execute:

a conversion process, in a neural network configured with an input layer, an output layer, and two or more intermediate layers which are provided between the input layer and the output layer, in each of which calculation is performed by giving data obtained from a previous layer and a first learning parameter that is the set of weight parameters of the prediction model to an activation function, and from which a calculation result is output to a subsequent layer, for converting the number of dimensions of output data from each of the intermediate layers into a same number of dimensions on a basis of the output data from each of the intermediate layers and a second learning parameter and outputting output data after conversion from each of the intermediate layers, and a reallocation process for reallocating the feature variables in a first feature variable space given to the input layer to a second feature variable space on a basis of the output data after conversion from the conversion process and the feature variables in the first feature variable space, and in the degree-of-importance calculation process, the processor is configured to calculate the degree of importance of each feature variable on each of the intermediate layers on a basis of the output data after conversion and a third learning parameter.

5. The data analysis apparatus according to claim 4, wherein in the weight parameter learning process, the processor is configured to adjust the first learning parameter, the second learning parameter, and the third learning parameter using the prediction result and ground truth data corresponding to the feature variables in the first feature variable space in a case in which training data containing the feature variables in the first feature variable space and the ground truth data corresponding to the feature variables is given.

6. The data analysis apparatus according to claim 1, wherein in the operation process, the processor is configured to operate a range of each of the first regularization coefficient and the second regularization coefficient to fall in a range of a sum of the first regularization coefficient and the second regularization coefficient.

7. The data analysis apparatus according to claim 6, wherein in the operation process, the processor is configured to operate the range of each of the first regularization coefficient and the second regularization coefficient in response to an operation input to a user interface displayed on the data analysis apparatus or on another apparatus communicably connected to the data analysis apparatus.

8. The data analysis apparatus according to claim 1, wherein in the selection process, the processor is configured to select the first feature variable group and a third feature variable group not contributing to prediction and selects feature variables other than the first feature variable group and the third feature variable group as the second feature variable group from among the set of feature variables, in the operation process, in the loss function, the processor is configured to operate the first regularization coefficient related to the first weight parameter group corresponding to the first feature variable group among the set of weight parameters configuring the prediction model in such a manner that the loss function is larger, operate the second regularization coefficient related to the second weight parameter group corresponding to the second feature variable group in such a manner that the loss function is smaller, and operate a third regularization coefficient related to a third weight parameter group corresponding to the third feature variable group in such a manner that the loss function is larger, and in the weight parameter learning process, the processor is configured to learn the set of weight parameters of the prediction model in such a manner that the loss function is minimum as a result of varying the first regularization coefficient, the second regularization coefficient, and the third regularization coefficient by the operation process.

9. The data analysis apparatus according to claim 8, wherein the processor is configured to:

execute a prediction process for calculating the prediction result and prediction accuracy of the prediction result based on the prediction result and the ground truth data, and in the operation process, the processor is configured to re-operate the first regularization coefficient, the second regularization coefficient, and the third regularization coefficient in a case in which the prediction accuracy is equal to or lower than predetermined prediction accuracy, and in the weight parameter learning process, the processor is configured to re-learn the set of weight parameters of the prediction model in such a manner that the loss function is minimum as a result of re-operating the first regularization coefficient, the second regularization coefficient, and the third regularization coefficient by the operation process.

10. The data analysis apparatus according to claim 8, wherein the processor is configured to:

execute a degree-of-importance calculation process for calculating a degree of importance of each of the feature variables on a basis of the set of weight parameters, and in the selection process, the processor is configured to select the first feature variable group, the second feature variable group, and the third feature variable group on a basis of the degree of importance calculated by the degree-of-importance calculation process.

11. The data analysis apparatus according to claim 10, wherein in the degree-of-importance calculation process, the processor is configured to calculate a degree of importance of each first feature variable in the first feature variable group, a degree of importance of each second feature variable in the second feature variable group, and a degree of importance of each third feature variable in the third feature variable group in such a manner that the degree of importance of the first feature variable and the degree of importance of the third feature variable are lower than the degree of importance of the second feature variable.

12. A data analysis method executed by a data analysis apparatus having a processor that is configured to execute a machine learning program including a learning process and a prediction process, wherein, in the learning process, learning parameters are calculated in such a manner that an error between a predicted value obtained from a feature vector variable that is an input and a true value is minimum and, in the prediction process, a new predicted value is calculated from data not used for learning which are test data and a storage device that stores the program, the method, executed by the processor, comprising:

a selection process for selecting from a set of feature variables that are training data, a first feature variable group that is a trivial feature variable group, wherein trivial feature variables are nearly equivalent to the true value of the predicted value, and a second feature data group other than the first feature variable group;

an operation process for varying a first regularization coefficient related to a first weight parameter group corresponding to the first feature variable group among a set of weight parameters configuring a prediction model in such a manner that a loss function is larger, and varying a second regularization coefficient related to a second weight parameter group corresponding to the second feature variable group among the set of weight parameters configuring the prediction model in such a manner that the loss function is smaller, wherein the loss function related to a difference between a prediction result output in a case of inputting the set of feature variables to the prediction model and ground truth data corresponding to the feature variables; and a weight parameter learning process for learning the set of weight parameters of the prediction model in such a manner that the loss function is minimum as a result of varying the first regularization coefficient and the second regularization coefficient by the operation process;

and the method, executed by the processor, further configured to:

within the prediction process, calculate the prediction result and prediction accuracy of the prediction result based on the prediction result and the ground truth data;

in the operation process, re-operate the first regularization coefficient and the second regularization coefficient in a case in which the prediction accuracy is equal to or lower than predetermined prediction accuracy; and in the weight parameter learning process, re-learn the set of weight parameters of the prediction model in such a manner that the loss function is minimum as a result of re-operating the first regularization coefficient and the second regularization coefficient by the operation process.

* * * * *